(12) United States Patent
Gyobu

(10) Patent No.: US 12,073,139 B2
(45) Date of Patent: Aug. 27, 2024

(54) INFORMATION PROCESSING APPARATUS, INFORMATION PROCESSING METHOD, AND NON-TRANSITORY RECORDING MEDIUM

(71) Applicant: Yoshikazu Gyobu, Tokyo (JP)

(72) Inventor: Yoshikazu Gyobu, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/224,073

(22) Filed: Jul. 20, 2023

(65) Prior Publication Data

US 2024/0036791 A1 Feb. 1, 2024

(30) Foreign Application Priority Data

Jul. 27, 2022 (JP) ................................. 2022-119725

(51) Int. Cl.
  *G06F 3/14* (2006.01)
  *G06T 5/50* (2006.01)
  *G06T 7/70* (2017.01)
(52) U.S. Cl.
  CPC ................. *G06F 3/14* (2013.01); *G06T 5/50* (2013.01); *G06T 7/70* (2017.01); *G06T 2207/20221* (2013.01)
(58) Field of Classification Search
  CPC ..... G06F 3/14; G06T 5/50; G06T 7/70; G06T 2207/20221
  See application file for complete search history.

(56) References Cited

U.S. PATENT DOCUMENTS

| 10,582,115 | B1 | 3/2020 | Rakshit et al. |
| 10,643,386 | B2* | 5/2020 | Li ........................... G06T 13/80 |
| 10,708,507 | B1* | 7/2020 | Dawson ............... H04N 23/635 |
| 10,809,066 | B2* | 10/2020 | Colburn ................. G06V 20/20 |
| 10,825,247 | B1* | 11/2020 | Vincent ................. G06T 19/003 |
| 11,164,361 | B2* | 11/2021 | Moulon ............... G01C 21/206 |
| 11,164,368 | B2* | 11/2021 | Vincent ................. G06T 15/506 |
| 11,243,656 | B2* | 2/2022 | Li ........................ G06F 3/04815 |
| 11,252,329 | B1* | 2/2022 | Cier ........................ H04N 23/53 |
| 11,481,925 | B1* | 10/2022 | Li ........................ H04N 23/698 |

(Continued)

FOREIGN PATENT DOCUMENTS

| JP | 2017-146327 | 8/2017 |
| JP | 2020-087287 | 6/2020 |
| JP | 2022-130180 | 9/2022 |

OTHER PUBLICATIONS

Extended European search report issued on Dec. 12, 2023, in corresponding European patent Application No. 23184016.6, 7 pages.

*Primary Examiner* — Michael Pervan
(74) *Attorney, Agent, or Firm* — XSENSUS LLP

(57) ABSTRACT

An information processing apparatus includes circuitry to generate an input-and-output screen. The input-and-output screen displays, in a superimposed manner, a map, a first position image indicating a first image capturing position positioned with respect to the map, and a second position image indicating a second image capturing position temporarily positioned with respect to the first image capturing position, and receives a position change operation being an operation of changing a relative position of the second position image with respect to the first position image.

18 Claims, 30 Drawing Sheets

(56) References Cited

U.S. PATENT DOCUMENTS

| | | | |
|---|---|---|---|
| 11,790,648 B2* | 10/2023 | Stoeva | G06V 20/52 |
| | | | 382/154 |
| 11,836,973 B2* | 12/2023 | Wixson | G06T 7/0002 |
| 2010/0122208 A1 | 5/2010 | Herr et al. | |
| 2019/0020816 A1 | 1/2019 | Shan et al. | |
| 2019/0020817 A1 | 1/2019 | Shan et al. | |
| 2019/0266293 A1* | 8/2019 | Ishida | G06T 19/00 |
| 2019/0306419 A1 | 10/2019 | Kajiwara | |
| 2020/0074668 A1* | 3/2020 | Stenger | G06V 20/36 |
| 2021/0117582 A1* | 4/2021 | Kamenca | G06F 30/13 |
| 2021/0199809 A1* | 7/2021 | Wynn | G03B 37/02 |
| 2021/0385378 A1* | 12/2021 | Cier | H04N 5/265 |
| 2022/0003555 A1* | 1/2022 | Colburn | G05D 1/0246 |
| 2022/0076019 A1* | 3/2022 | Moulon | G05D 1/0238 |
| 2022/0092227 A1* | 3/2022 | Yin | G06F 30/27 |
| 2022/0114291 A1* | 4/2022 | Li | G06T 19/00 |
| 2022/0164493 A1* | 5/2022 | Li | G06V 10/23 |
| 2022/0189122 A1* | 6/2022 | Li | G06Q 30/0278 |
| 2022/0269885 A1* | 8/2022 | Wixson | G06T 7/0002 |
| 2022/0269888 A1* | 8/2022 | Stoeva | G06T 19/006 |
| 2022/0301129 A1* | 9/2022 | Sharifi | G06N 3/08 |
| 2023/0095173 A1* | 3/2023 | Khosravan | G06T 5/92 |
| 2023/0419662 A1* | 12/2023 | Stoeva | G06T 19/006 |

* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

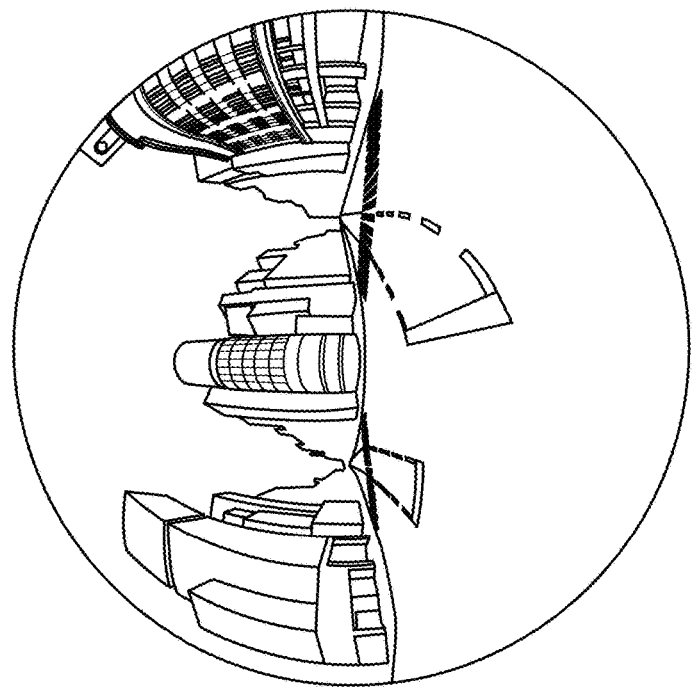
FIG. 4B
SPHERICAL IMAGE CE
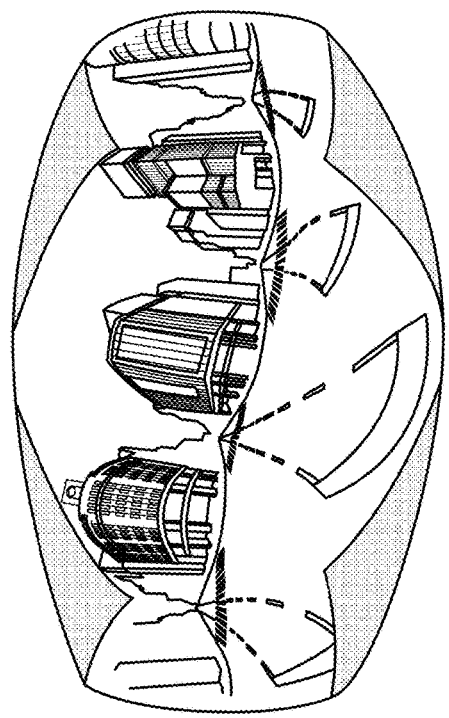
FIG. 4A
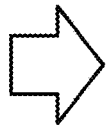
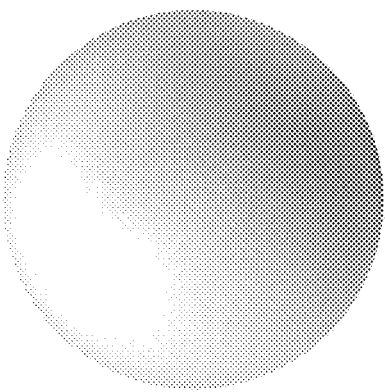
EQUIRECTANGULAR PROJECTION IMAGE EC FIG. 12A
IMAGE CAPTURING POSITION ○
FIG. 12B
RESULT OF POSITION ESTIMATION
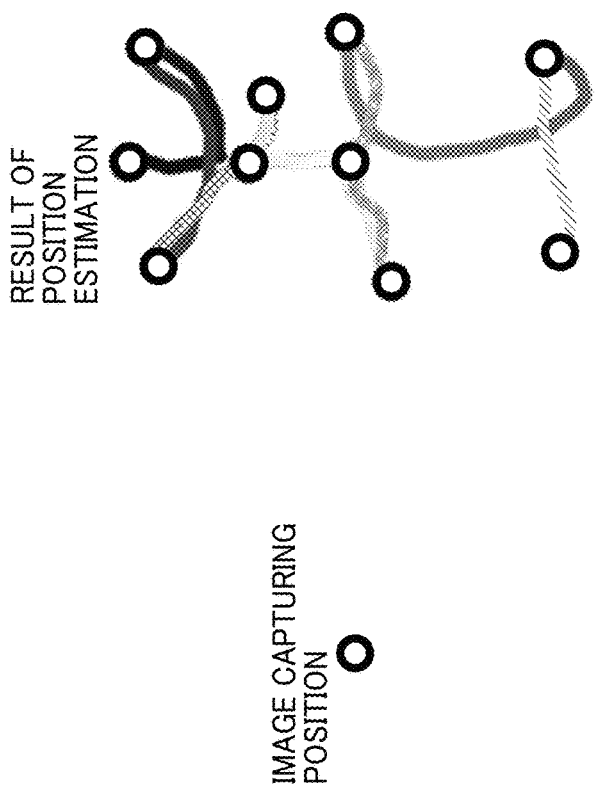
FIG. 12C
TOUR PATH
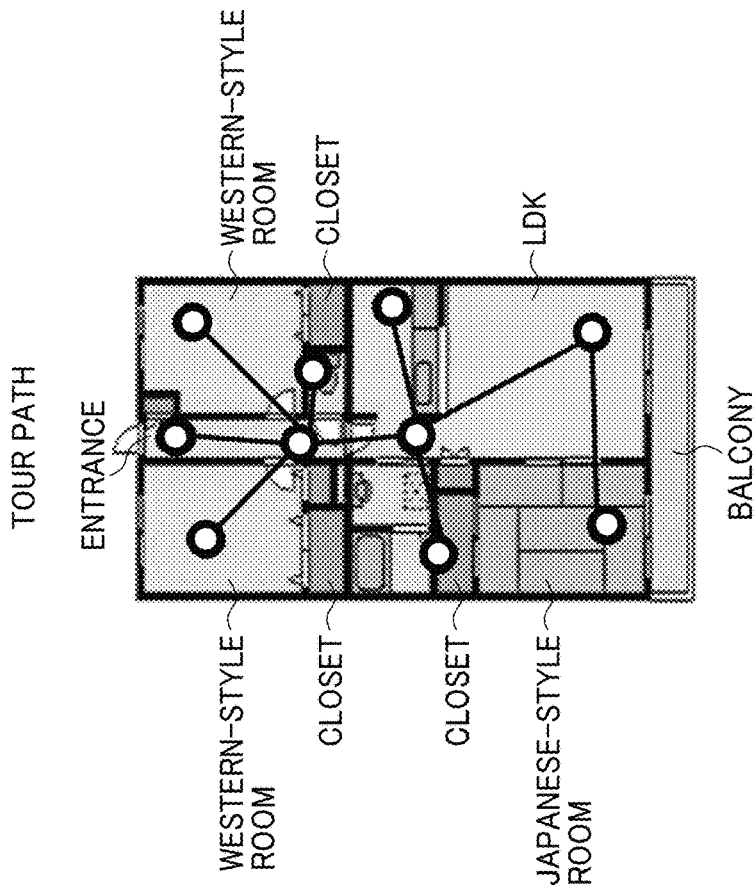

FIG. 16

| MAP 1 | | | | | | |
|---|---|---|---|---|---|---|
| NO. | IMAGE CAPTURING POSITION | IMAGE CAPTURING DIRECTION | IMAGE CAPTURING RANGE | STILL IMAGE | IMAGE DIRECTION | IMAGE RANGE |
| 1 | ⋮ | ⋮ | ⋮ | ⋮ | ⋮ | ⋮ |
| 2 | ⋮ | ⋮ | ⋮ | ⋮ | ⋮ | ⋮ |
| 3 | ⋮ | ⋮ | ⋮ | ⋮ | ⋮ | ⋮ |

5002

INFORMATION PROCESSING APPARATUS, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-119725, filed on Jul. 27, 2022, in the Japan Patent Office, the entire disclosure of which is hereby incorporated by reference herein.

BACKGROUND

Technical Field

The present disclosure relates to an information processing apparatus, an information processing method, and a non-transitory recording medium.

Related Art

In a related art, visual data from a plurality of viewing locations is captured, data that links the plurality of viewing locations is captured, the visual data of the plurality of viewing locations is analyzed to create a panoramic image from each viewing location, linking data is analyzed, relative positions/directions between at least some display locations are determined, an inter-panorama link to each of one or more other panoramas is created in a panorama based on the determined positions/directions, and a plurality of linked panoramic images is displayed to represent an interior space.

In a related art, video data from a plurality of viewing locations and data that links the plurality of viewing locations are captured, a panoramic image of each viewing location is created, link information is analyzed to generate a model of a travel route of a user, relative positions/directions between at least some of the viewing locations are determined, an inter-panorama link to each of one or more other panoramas is created in a panorama based on the determined positions/directions, and the plurality of linked panoramic images is displayed to represent an interior space.

In a related art, an information processing system including a first acquisition unit configured to acquire first orientation information indicating an orientation in a drawing based on the drawing, a second acquisition unit configured to acquire second orientation information indicating an orientation in a captured image based on the captured image captured at a position indicated in the drawing, and a linking unit configured to link the orientation in the drawing with the orientation in the captured image based on the first orientation information and the second orientation information.

SUMMARY

According to an embodiment of the disclosure, an information processing apparatus includes circuitry to generate an input/output screen. The input/output screen displays, in a superimposed manner, a map, a first position image indicating a first image capturing position positioned with respect to the map, and a second position image indicating a second image capturing position temporarily positioned with respect to the first image capturing position, and receives a position change operation being an operation of changing a relative position of the second position image with respect to the first position image.

According to an embodiment of the disclosure, an information processing method includes generating an input/output screen. The input/output screen displays, in a superimposed manner, a map, a first position image indicating a first image capturing position positioned with respect to the map, and a second position image indicating a second image capturing position temporarily positioned with respect to the first image capturing position, and receives a position change operation being an operation of changing a relative position of the second position image with respect to the first position image.

According to an embodiment of the disclosure, a non-transitory recording medium stores a plurality of instructions which, when executed by one or more processors, causes the processors to perform a method. The input/output screen displays, in a superimposed manner, a map, a first position image indicating a first image capturing position positioned with respect to the map, and a second position image indicating a second image capturing position temporarily positioned with respect to the first image capturing position, and receives a position change operation being an operation of changing a relative position of the second position image with respect to the first position image.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4A is a conceptual diagram illustrating an example of how an equirectangular projection image is mapped to a surface of a sphere, according to the exemplary embodiment of the present disclosure:

FIG. 4B is a diagram illustrating an example of a spherical image, according to the exemplary embodiment of the present disclosure;

FIGS. 12A to 12C are schematic diagrams illustrating an example of operation performed by a server according to the exemplary embodiment of the present disclosure;

FIG. 16 is a schematic diagram illustrating an example of an image management table according to the exemplary embodiment of the disclosure;

Figure 1:
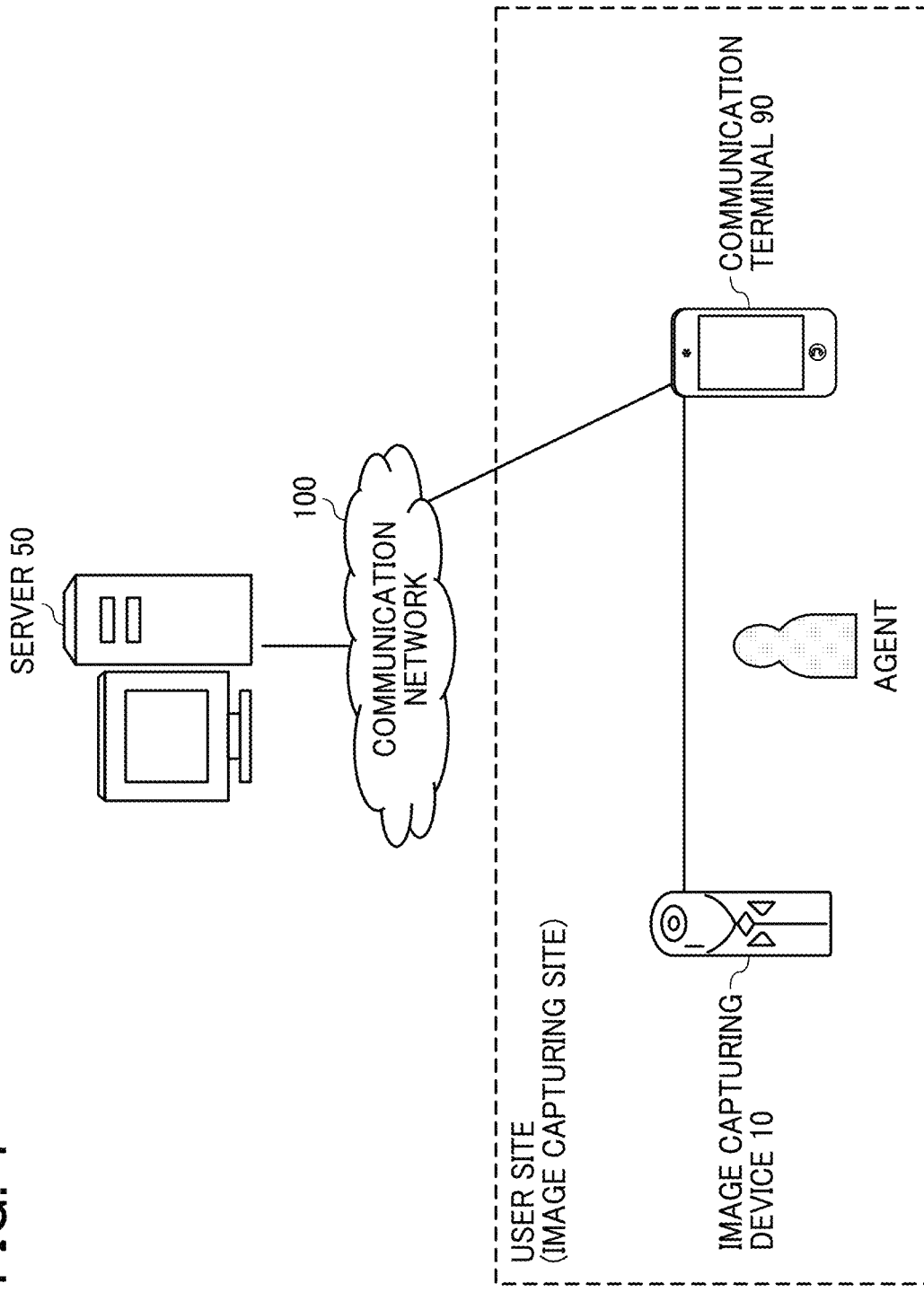
FIG. 1 is a diagram illustrating an example of an overall configuration of an image processing system according to an exemplary embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the attached drawings. In the description of the drawings, the same elements are denoted by the same reference numerals, and redundant descriptions thereof are omitted.

Embodiments Overview of Image Processing System

FIG. 1 is a diagram illustrating an example of an overall configuration of an image processing system according to an embodiment of the present disclosure.

An image processing system 1 illustrated in FIG. 1 is an example of an information processing system, and is a system that performs image processing on a captured image for allowing a viewer to view, by online, an interior space of a structure such as a real estate property or a building or a structure such as construction or civil engineering.

As illustrated in FIG. 1, the image processing system 1 includes an image capturing device 10, a server 50, and a communication terminal 90. The server 50 and the communication terminal 90 included in the image processing system 1 can communicate with each other via a communication network 100. The image capturing device 10 can communicate with the communication terminal 90 by short-range wireless communication such as Wi-Fi, but may communicate with the server 50 and the communication terminal 90 via the communication network 100. The communication network 100 includes the Internet, a mobile communication network, and a local area network (LAN), for example. The communication network 100 may include, in addition to a wired network, a wireless network in compliance with such as 3rd Generation (3G), 4th Generation (4G), 5th Generation (5G), WIRELESS FIDELITY (WI-FI), Worldwide Interoperability for Microwave Access (WiMAX), Long Term Evolution (LTE), etc.

The server 50 is an example of an information processing apparatus, and is a server computer that performs image processing on a captured image obtained by capturing, at a predetermined site, an image of an interior space of a structure such as a real estate property or a building or an image of a structure of civil engineering. The server 50 obtains a captured image captured by the image capturing device 10, and generates a tour image in order to provide a virtual tour to a user, using the obtained captured image, for example. The virtual tour is content that allows a user to view a real estate property as if the user were actually viewing the real estate property on the site, for example. The tour image is generated by using a plurality of captured images that are captured by the image capturing device 10. The tour image is an image that is to be viewed by a user and that allows the user to virtually move in a site in the captured image according to a user operation. In addition to an interior space of a structure related to a real estate property or a building site, such a virtual tour is suitably carried out in an external space of a tourist spot or a structure of a theme park, for example. In other words, an interior space of a structure can be regarded as being within a predetermined area. When a virtual tour is carried out in an external space of a structure, the present embodiment can be implemented by replacing a map indicating an interior space of a structure of a real estate property or a building, which is described later, with a tourist spot map introducing a tourist spot or an area map of a theme park, for example.

The server 50 can be implemented by a single server computer or can be implemented by a plurality of server computers. In the following, the server 50 is described as a server computer residing on a cloud environment. In some embodiments, the server 50 may be a server residing on an on-premises environment.

The image capturing device 10 is a special digital camera (spherical image capturing device) that can obtain a spherical image (360-degree image in both the circumferential direction and the vertical direction) by capturing an image of a space in all directions in an image capturing site where a structure such as a real estate property is present. The spherical image capturing device and the spherical image may also be referred to as an omnidirectional image capturing device and an omnidirectional image, respectively.

The spherical image refers to an image having a so-called solid angle 4πsr [sr: steradian].

In the present specification, an image in which a partial area of the spherical image is missing is also referred to as a spherical image for the sake of convenience. Such an image includes, for example, an image in which a part of a direction directly above or below the spherical image capturing device is missing, an image in which a part of a vertically upward direction or a vertically downward direction of the spherical image is missing, and an image in which a part of a predetermined area of the spherical image is missing.

This is because considering a possible use case in which a user does not carefully view a part that is immediately above or immediately below an object captured in a spherical image when viewing the spherical image, for example. In such a case, it is also assumed that the spherical image itself is not displayed by designing an imaging element and an optical system so as not to capture the part, by not displaying an image, or by displaying a logo on the part, for example.

The image capturing device 10 is used by, for example, a real estate agent that manages or sells real estate properties. The image capturing device 10 may be a wide-angle camera or a stereo camera that can obtain a wide-angle image having an angle of view equal to or greater than a predetermined value. The wide-angle image is generally an image taken with a wide-angle lens, such as a lens that can take a range wider than a range that the human eyes can perceive. In other words, the image capturing device 10 is image capturing unit that can acquire an image (a spherical image or a wide-angle image) captured using a lens having a focal length shorter than a predetermined value. The wide-angle image is generally an image taken with a lens having a focal length of 35 mm or less in terms of 35 mm film. Further, the image capturing device 10 may have a panoramic image capturing function in the image capturing function, and may capture a panoramic image.

The communication terminal 90 is an example of an input and output device, and is a computer such as a smartphone that displays an image processed by the server 50 and allows a viewer to view the image. The communication terminal 90 is used by, for example, the same real estate agent as the image capturing device 10. In the communication terminal 90, for example, a dedicated application for instructing the image capturing device 10 to capture an image and receiving an image provided from the server 50 to allow a user to view the image is installed. Alternatively, the communication terminal 90 may instruct to capture an image and allow a user to view an image by accessing a dedicated website using a web browser without the dedicated application. Further, instructing to capture an image and allowing a user to view an image may be performed by an additional or a different communication terminal 90.

Note that the communication terminal 90 is not limited to a smartphone, and may be, for example, a personal computer (PC), a tablet terminal, a wearable terminal, a head mount display (HMD), or an interactive white board (IWB: an electronic whiteboard having mutual communication capability).

Overview of Image Capturing Device

Figure 2:
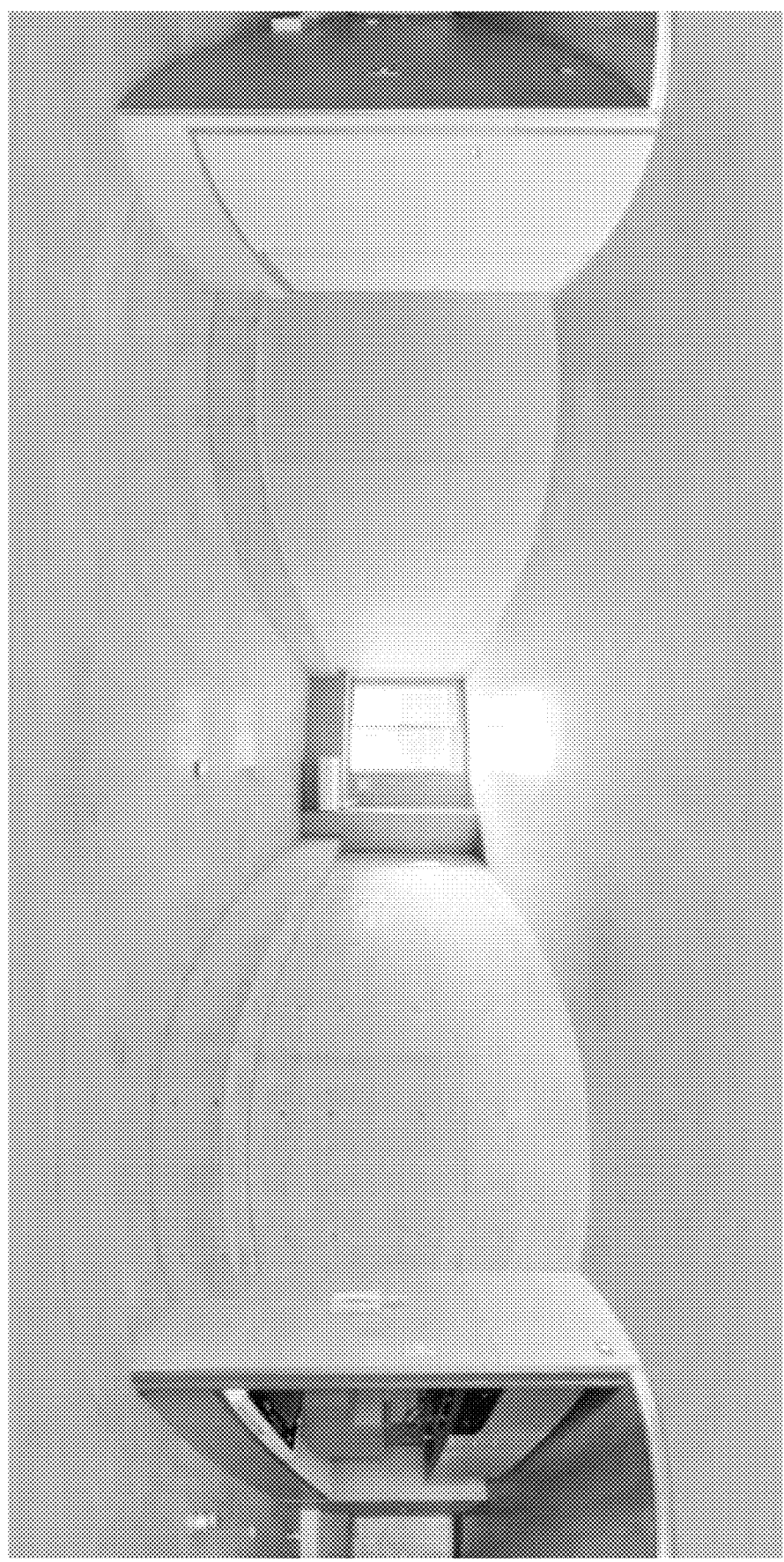
FIG. 2 is a diagram illustrating an example of a spherical image captured by an image capturing device according to the exemplary embodiment of the present disclosure.

An overview of the image capturing device 10 included in the image processing system 1 is described with reference to FIGS. 2 to 11. FIG. 2 is a diagram illustrating an example of a spherical image captured by an image capturing device. The image illustrated in FIG. 2 is a spherical image of a room of a real estate property, which is an example of an interior space of a structure, captured by the image capturing device 10. The spherical image is suitable for, for example viewing a real estate property, because the inside of a room can be captured in all directions. There are various forms of the spherical image, but the spherical image is often generated by an equirectangular projection, which is described later. The image generated by the equirectangular projection is advantageous in that the outer shape of the image is rectangular and the image data can be stored efficiently and easily, and that the image looks relatively natural because the distortion near the equator is small and the straight line in the vertical direction is not distorted.

Method for Generating Spherical Image

Figure 3A:
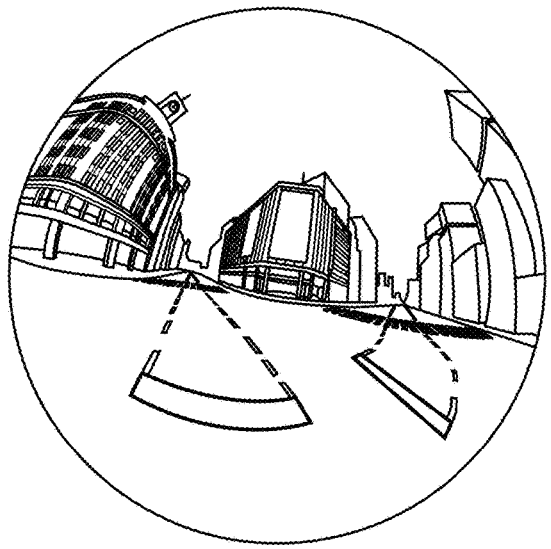
FIG. 3A is a diagram illustrating a hemispherical image (front side) captured by the image capturing device according to the exemplary embodiment of the present disclosure.
Figure 3B:
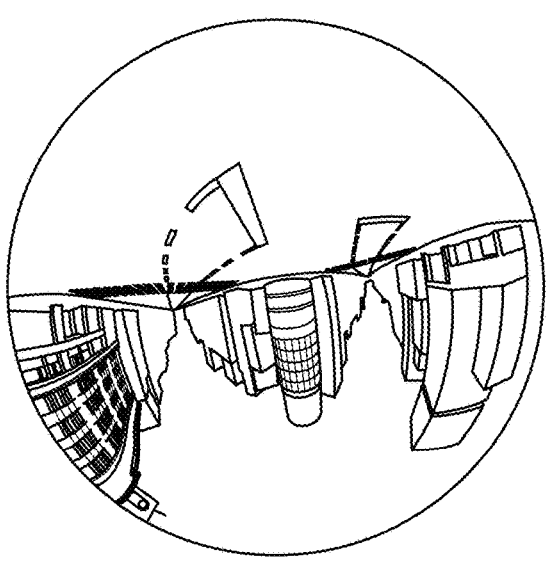
FIG. 3B is a diagram illustrating a hemispherical image (back side) captured by the image capturing device according to the exemplary embodiment of the present disclosure.
Figure 3C:
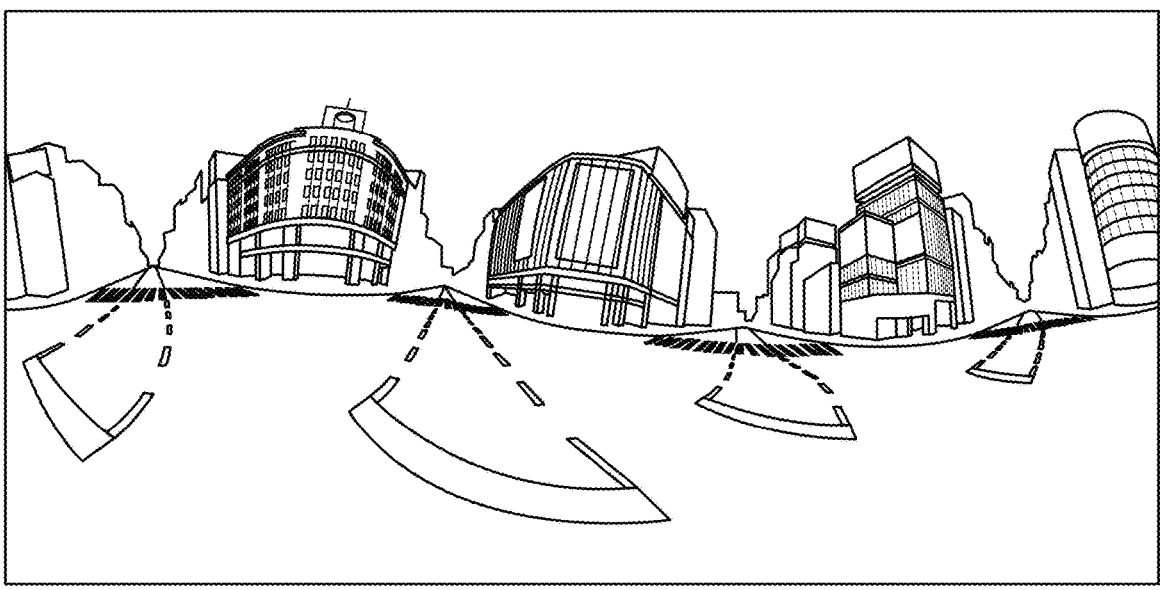
FIG. 3C is a diagram illustrating an image in equirectangular projection according to the exemplary embodiment of the present disclosure.

Referring to FIGS. 3 (3A to 3C) to 9 (9A and 9B), operation of generating a spherical image is described according to an exemplary embodiment. Referring to FIGS. 3A to 3C and FIGS. 4A and 4B, an overview of a method of generating a spherical image from an image captured by the image capturing device 10 is described. FIG. 3A is a diagram illustrating a hemispherical image (front side) captured by the image capturing device 10. FIG. 3B is a diagram illustrating a hemispherical image (back side) captured by the image capturing device 10. FIG. 3C is a diagram illustrating an image in equirectangular projection, which is referred to as an "equirectangular projection image" (or equidistant cylindrical projection image). FIG. 4A is a diagram illustrating an example of how the equirectangular projection image is mapped to a surface of a sphere. FIG. 4B is a diagram illustrating an example of a spherical image.

The image capturing device 10 is provided with an imaging element on each of a front surface side (front side) and a rear surface side (rear side). These imaging elements (image sensors) are used in combination with optical members each can capture a hemispherical image having an angle of view of 180 degrees or wider. The image capturing device 10 obtains two hemispherical images by capturing a subject around the user by the two imaging elements.

As illustrated in FIGS. 3A and 3B, an image captured by the imaging element of the image capturing device 10 is a curved hemispherical image (front side and back side). The image capturing device 10 combines the hemispherical image (front side) and the hemispherical image (back side), which are reversed by 180-degree from each other, to generate an equirectangular projection image EC as illustrated in FIG. 3C.

The image capturing device 10 uses Open Graphics Library for Embedded Systems (OpenGLES) to map the equirectangular projection image EC in a manner that the sphere surface is covered as illustrated in FIG. 4A, to generate a spherical image (spherical panoramic image) CE as illustrated in FIG. 4B. In other words, the spherical image CE is represented as an image corresponding to the equirectangular projection image EC a surface of which faces toward the center of the sphere. It should be noted that the OpenGL ES is a graphic library used for visualizing two-dimensional (2D) data and three-dimensional (3D) data.

The spherical image CE is either a still image or a moving image. Further, the conversion method is not limited to the OpenGL ES, and may be any method of converting a hemispherical image into an equirectangular projection image, for example, a calculation by a CPU or a calculation by Open Compute Language (OpenCL).

As described above, since the spherical image CE is an image attached to the sphere surface to cover the sphere surface, a part of the image may look distorted when viewed from the user, giving a feeling of strangeness. To resolve this strange feeling, the image capturing device 10 displays an image of a predetermined area T, which is a part of the spherical image CE, as a planar image having fewer curves. The predetermined area is, for example, a part of the spherical image CE that is viewable by the user. In this disclosure, the image of the predetermined area, which is viewable, may be referred to as a "predetermined-area image Q". Hereinafter, a description is given of displaying the predetermined-area image Q with reference to FIG. 5 and FIG. 6.

Figure 5:
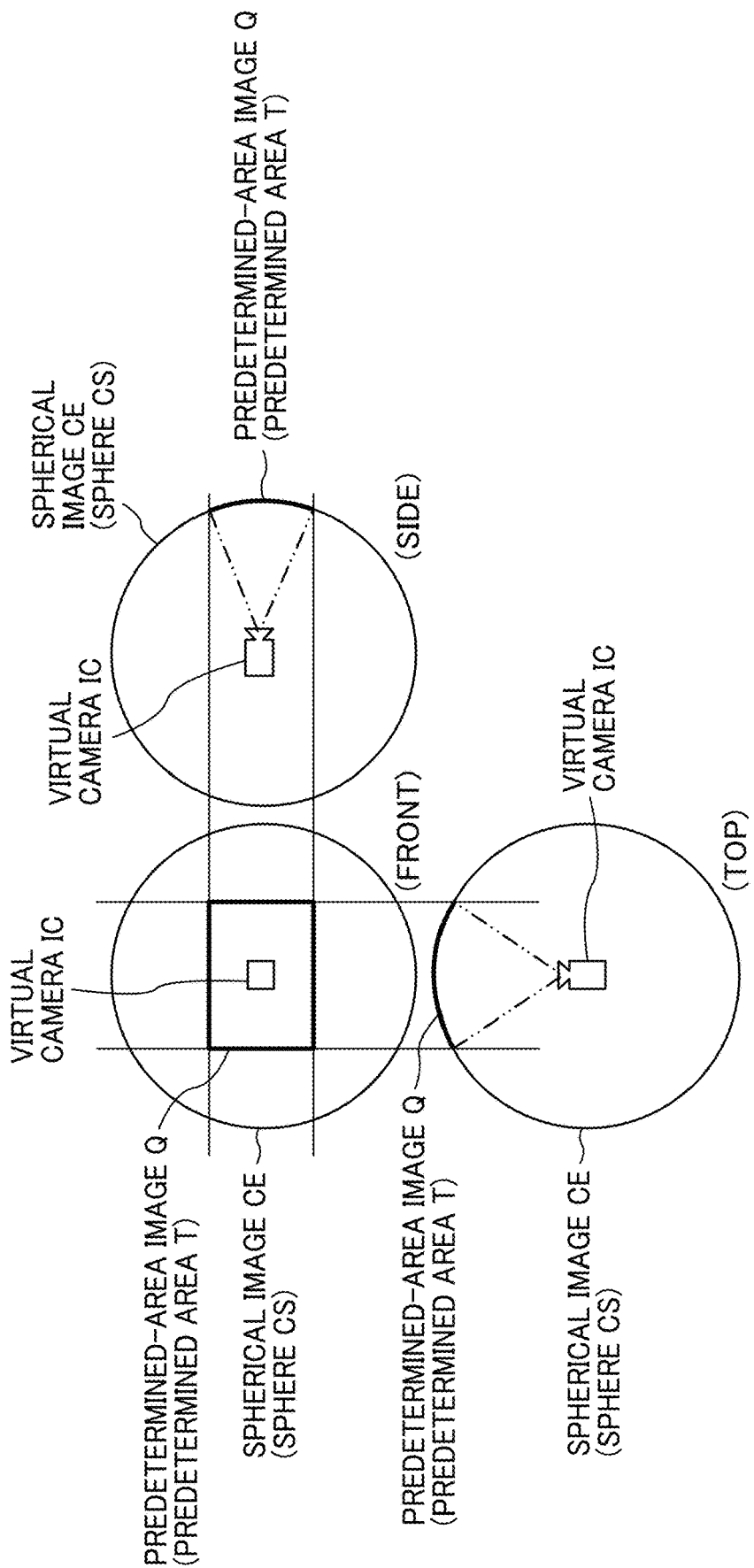
FIG. 5 is an illustration of relative positions of a virtual camera and a predetermined area in a case where a spherical image is represented as a surface area of a three-dimensional sphere, according to the exemplary embodiment of the present disclosure.

FIG. 5 is an illustration of relative positions of a virtual camera IC and a predetermined area in a case where the spherical image CE is represented as a surface area of a three-dimensional sphere. A virtual camera IC corresponds to a position of a point of view (viewpoint) of a user who is viewing the spherical image CE represented as a surface area of a three-dimensional solid sphere. In FIG. 5, the spherical image CE is represented as a surface area of a three-dimensional solid sphere CS. Assuming that the spherical image CE having been generated is the surface area of the solid sphere CS, the virtual camera IC is inside of the spherical image CE as illustrated in FIG. 5. The predetermined area T in the spherical image CE is an imaging area of the virtual camera IC. Specifically, the predetermined area T is specified by predetermined-area information indicating an image capturing direction and an angle of view of the virtual camera IC in a three-dimensional virtual space containing the spherical image CE. In addition, zooming in the predetermined area T is also determined by bringing the virtual camera IC closer to or away from the spherical image CE. The predetermined-area image Q is an image of the predetermined area T in the spherical image CE. The predetermined area T is defined by an angle of view a and a distance f from the virtual camera IC to the spherical image CE.

The predetermined-area image Q is displayed on a predetermined display as an image of the imaging area of the virtual camera IC. In the following description of the present embodiment, an image capturing direction (ea, aa) and the angle of view a of the virtual camera IC are used. In another example, the predetermined area T is identified by an imaging area (X, Y, Z) of the virtual camera IC, i.e., the predetermined area T, rather than the angle of view α and the distance f.

Figure 6:
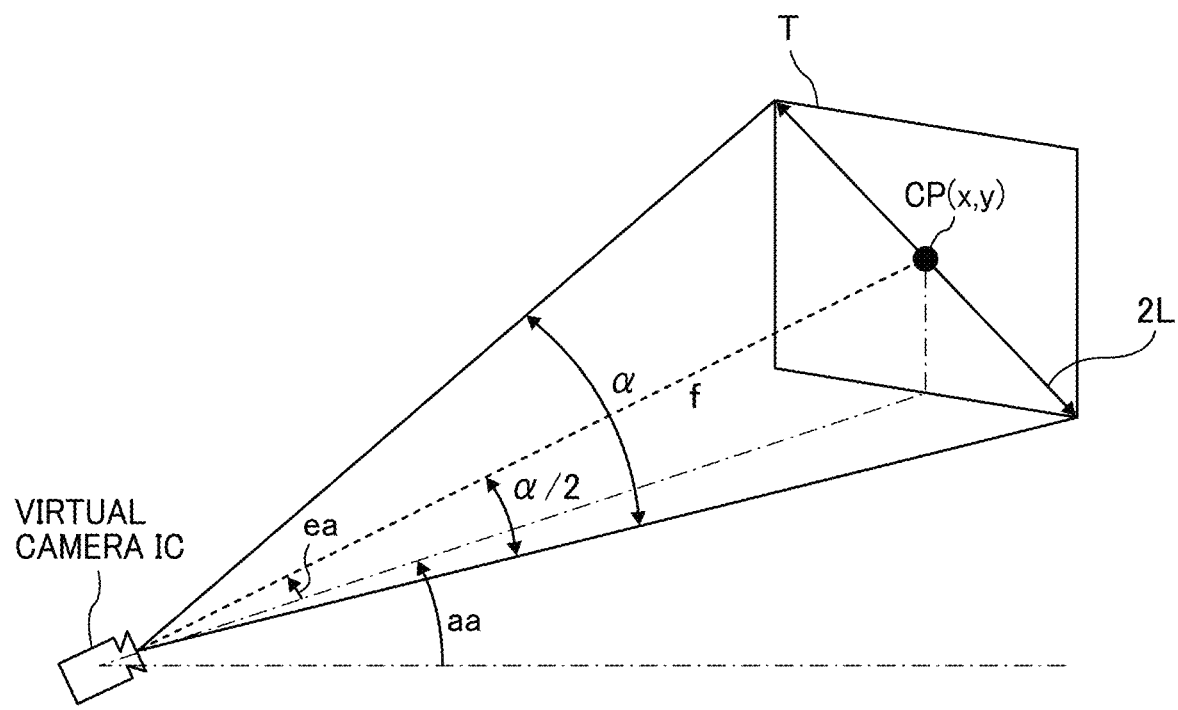
FIG. 6 is a diagram illustrating a relation between a predetermined-area information and an image of a predetermined area T, according to the exemplary embodiment of the present disclosure.

Referring to FIG. 6, a relation between the predetermined-area information and the image of the predetermined area T is described according to the present embodiment. FIG. 6 is a diagram illustrating a relation between the predetermined-area information and the image of the predetermined area T according to the present embodiment. As illustrated in FIG. 6, "ea" denotes an elevation angle, "aa" denotes an orientation angle, and "a" denotes an angle of view.

The position of the virtual camera IC is adjusted, such that the point of gaze of the virtual camera IC, indicated by the image capturing direction (ea, aa), matches the center point CP (x, y) of the predetermined area T as the imaging area of the virtual camera IC. As illustrated in FIG. 6, when it is assumed that a diagonal angle of the predetermined area T specified by the angle of view α of the virtual camera IC is α, the center point CP (x, y) provides the parameters (x, y) of the predetermined-area information. The predetermined-area image Q is an image of the predetermined area T in the spherical image CE, and "f" denotes the distance between the virtual camera IC and the center point CP (x, y). "L" is a distance between the center point CP (x, y) and a given vertex of the predetermined area T (2L is a diagonal line). In FIG. 6, a trigonometric function equation generally expressed by the following formula (Formula 1) is satisfied.

$$L/f = \tan(\alpha/2) \qquad \text{Formula 1}$$

Figure 7:
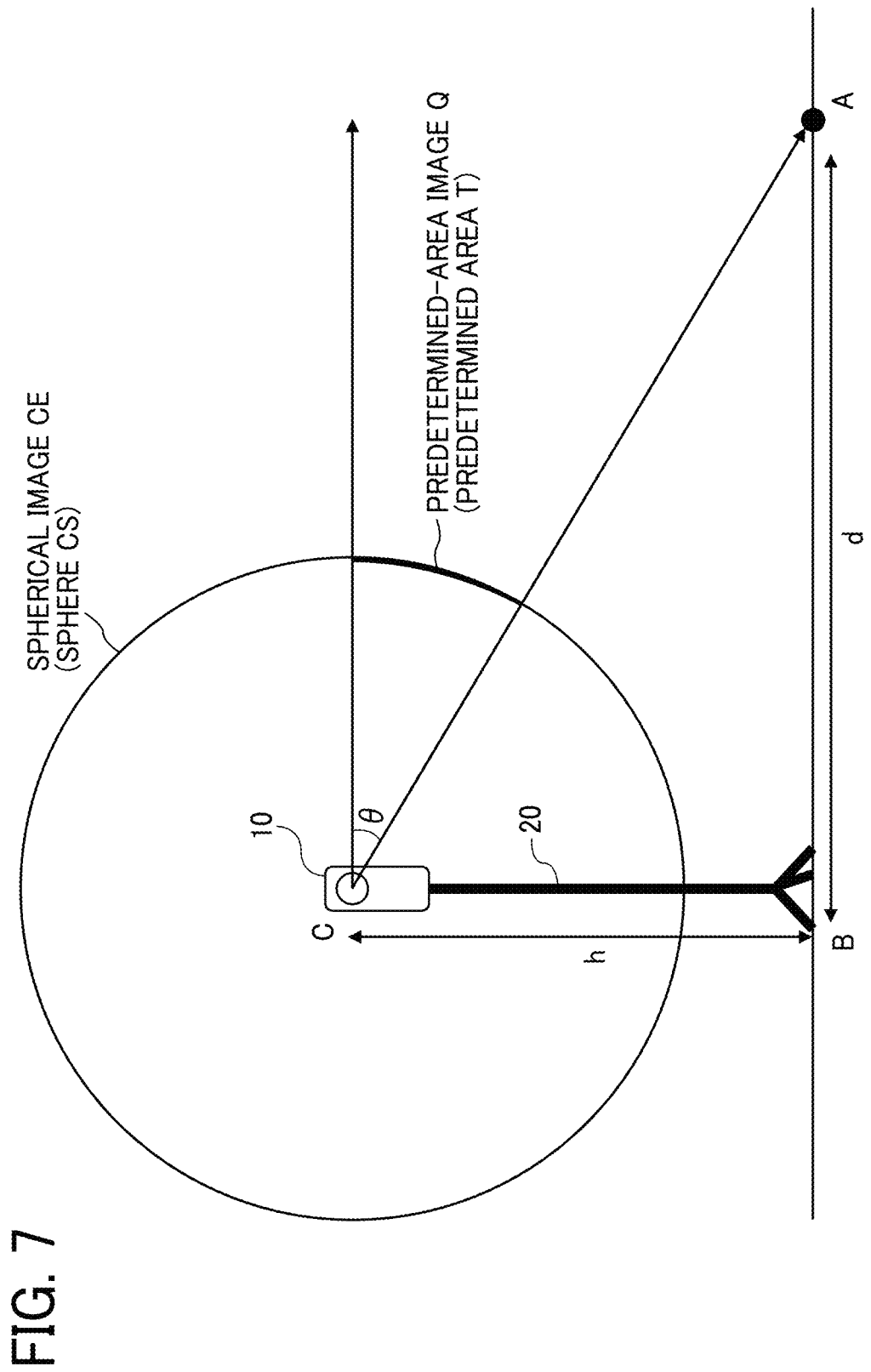
FIG. 7 is a diagram illustrating an example of a state at the time of capturing an image by the image capturing device according to the exemplary embodiment of the present disclosure.

A state at the time of capturing an image by the image capturing device 10 is described below with reference to FIG. 7. FIG. 7 is a diagram illustrating an example of a state at the time of capturing an image by an image capturing device according to the present embodiment. In order to capture an image so as to overlook the entire room of such as a real estate property, it is preferable that the image capturing device 10 is set at a position close to the height of human eyes. Accordingly, as illustrated in FIG. 7, the image capturing device 10 is generally fixed by a support member 20 such as a monopod or a tripod to capture an image. As described above, the image capturing device 10 is a spherical image capturing device that can capture light rays in all directions, and can be said to capture an image (spherical image CE) on a unit sphere around the image capturing device 10. When the image capturing direction is determined, the image capturing device 10 determines the coordinates of the spherical image. For example, in FIG. 7, a point A is at a distance (d, −h) away from a center point C of the image capturing device 10, and when an angle formed by a line segment AC and the horizontal direction is θ, the angle θ is expressed by the following formula (Formula 2).

$$\theta = \arctan(h/d) \quad \text{Formula 2}$$

In addition, assuming that the point A is at a depression angle θ, the distance d between the point A and the point B can be expressed by the following (Formula 3) using a height h at which the image capturing device 10 is set.

$$d = h/\tan\theta \quad \text{Formula 3}$$

Figure 8A:
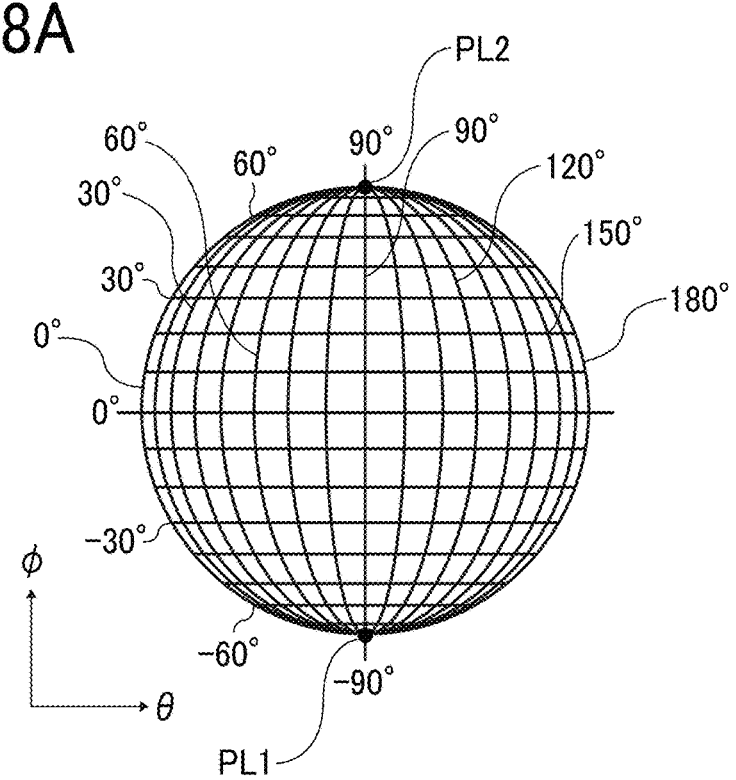
FIGS. 8A and 8B are diagrams each illustrating an example of a spherical image, according to the exemplary embodiment of the present disclosure.
Figure 8B:
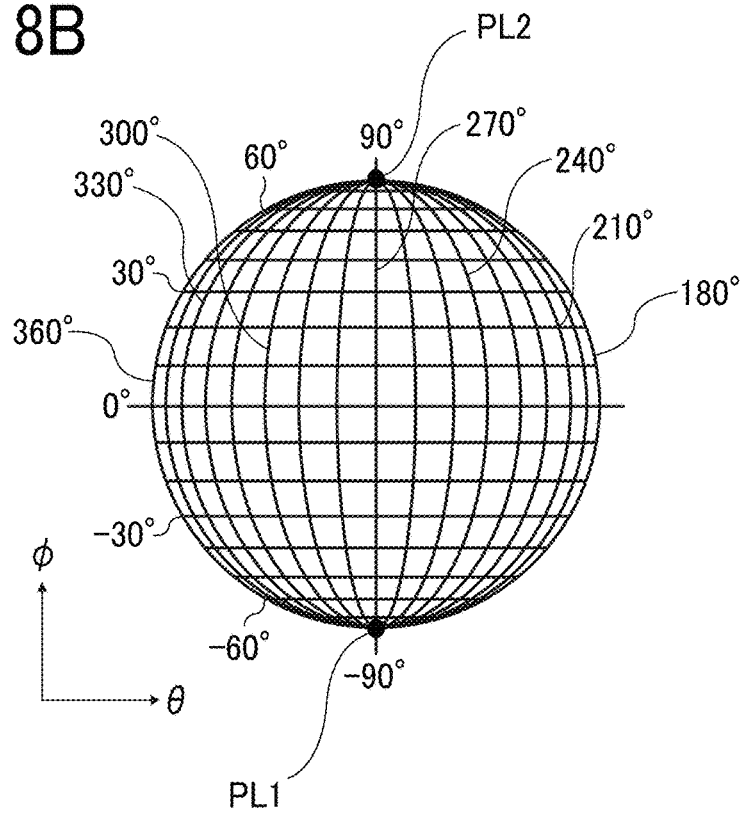

A process of converting position information indicating a position on the spherical image into coordinates on the planar image converted from the spherical image is schematically described below. FIGS. 8A and 8B are diagrams each illustrating an example of the spherical image according to the present embodiment. FIG. 8A is an illustration of the hemispherical image illustrated in FIG. 3A on which points at which incident angles in the horizontal direction and the vertical direction with respect to an optical axis are equivalent are connected to each other with lines, according to the present embodiment. In the following description, an incident angle in the horizontal direction with respect to the optical axis is referred to as "θ," and an incident angle in the vertical direction with respect to the optical axis is referred to as "φ."

Figure 9A:
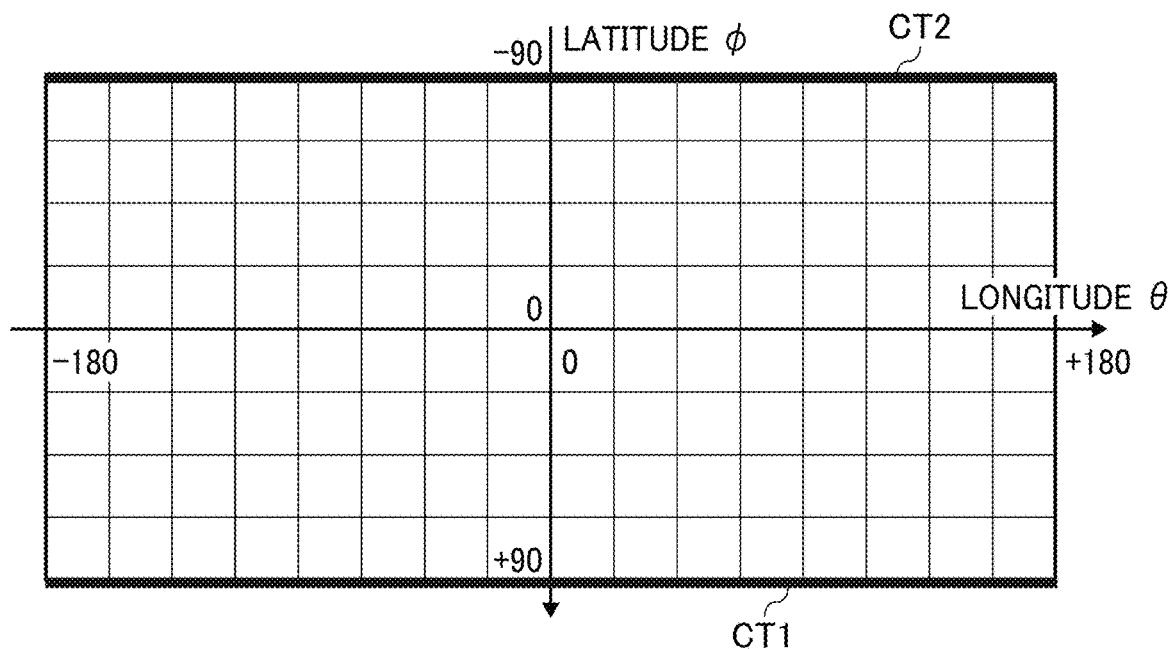
FIGS. 9A and 9B are diagrams each illustrating an example of a planar image converted from a spherical image, according to the exemplary embodiment of the present disclosure.

FIG. 9A is a diagram illustrating an example of an image obtained by processing of equirectangular projection. Specifically, when the images illustrated in FIGS. 8A and 8B are associated with each other using a look up table (LUT) generated in advance, and processed by the equirectangular projection, and the processed images illustrated in FIGS. 8A and 8B are combined. In this way, the image capturing device 10 generates a planar image illustrated in FIG. 9A corresponding to the spherical image. The equirectangular projection image EC illustrated in FIG. 3C is an example of the planar image illustrated in FIG. 9A.

As illustrated in FIG. 9A, in the image processed by the equirectangular projection, the latitude (θ) and the longitude (φ) are orthogonal to each other. In the example illustrated in FIG. 9A, a position in the spherical image is indicated by setting the center of the image to (0, 0), expressing a latitude direction as a value from −90 to +90, and expressing a longitude direction as a value from −180 to +180. For example, the coordinates of the upper left corner of the image are (−180, −90). The coordinates of the spherical image may be represented in a format using 360 degrees as illustrated in FIG. 9A, or may be represented by radian display or display of the number of pixels as in a real image. Alternatively, the coordinates of the spherical image may be converted into two dimensional coordinates (x, y) as illustrated in FIG. 9B.

Figure 9B:
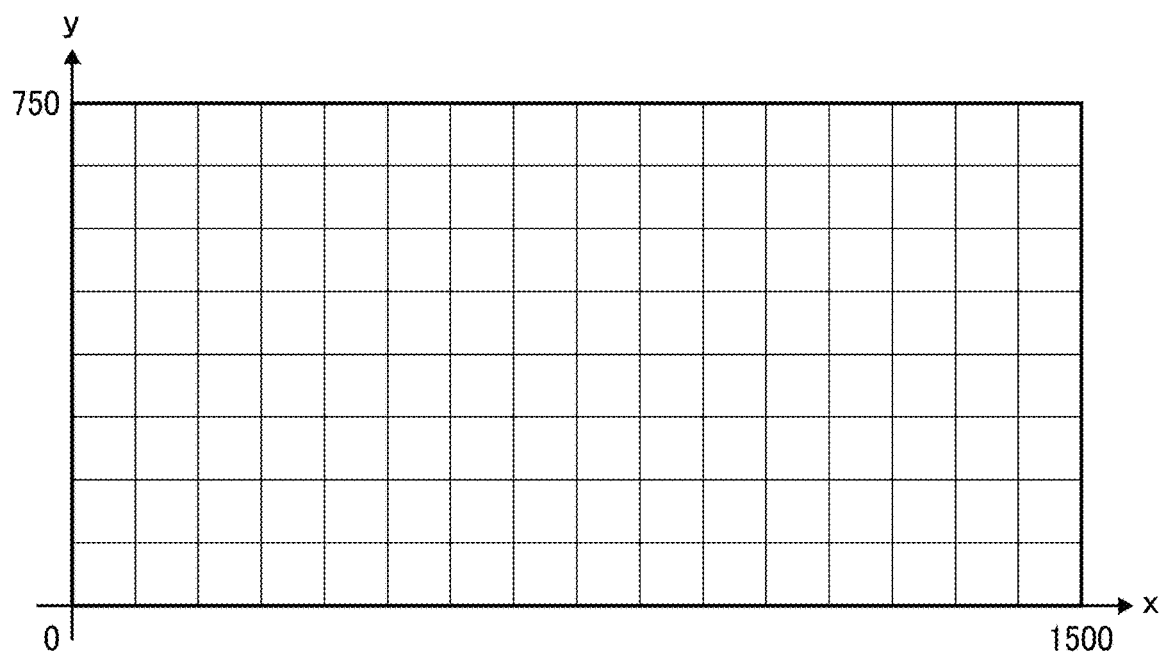

It should be noted that the process of combining for the planar image illustrated in FIG. 9A or 9B is not limited to the processing of simply and continuously arranging the hemispherical images illustrated in FIG. 8A and FIG. 8B.

For example, when the horizontal center of the spherical image is not θ=180 degrees, the image capturing device 10 first pre-processes the hemispherical image illustrated in FIG. 3A and arranges the hemispherical image at the center of the spherical image in the process of combining. Next, the image capturing device 10 may divide an image obtained by pre-processing the hemispherical image illustrated in FIG. 3B into sizes to be arranged as the left and right portions, and combines the hemispherical images to generate the equirectangular projection image EC illustrated in FIG. 3C.

In the planar image illustrated in FIG. 9A, a portion corresponding to the pole point (PL1 or PL2) of the hemispherical image (spherical image) illustrated in FIGS. 8A and 8B is a corresponding line segment CT1 or CT2. This is because, as illustrated in FIGS. 4A and 4B, the spherical image (for example, the spherical image CE) is created by pasting the planar image (the equirectangular projection image EC) illustrated in FIG. 9A on the sphere surface using the OpenGL ES.

Example of Image Capturing Device Applicable to Image Processing System

Figure 10A:
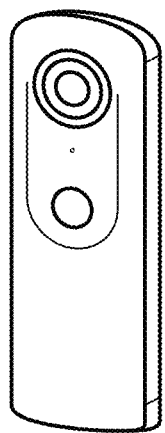
FIGS. 10A and 10B are schematic diagrams each illustrating an example of an image capturing device applicable to the image processing system according to the exemplary embodiment of the present disclosure.
Figure 10B:
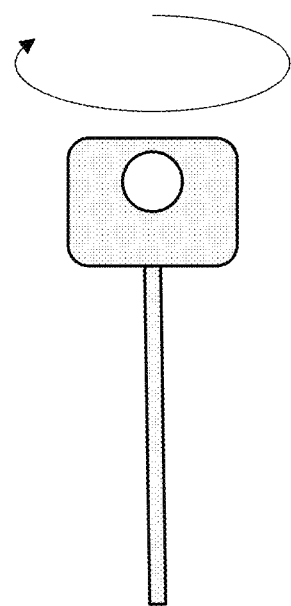

An example of the image capturing device 10 applicable to the image processing system 1 according to the present embodiment is described with reference to FIGS. 10A, 10B, and 11. FIGS. 10A and 10B are schematic diagrams each illustrating an example of an image capturing device applicable to the image processing system. FIG. 10A illustrates a special image capturing device including a plurality of imaging elements that can generate a spherical image by the above-described generation method.

The special image capturing device uses an optical system including a wide-angle lens or a fish-eye lens that has a wide angle of view, and can acquire an image captured in all directions by combining outputs of the plurality of imaging elements. FIG. 10B illustrates a general-purpose image capturing device, which is namely a standard camera. The general-purpose image capturing device is, for example, a standard digital camera or a mobile terminal such as a smartphone including a camera. A user who performs an operation for image capturing holds the general-purpose image capturing device in his or her hand and performs the operation for image capturing by rotating. In the specification, the user who performs an operation for image capturing may also be referred to as a photographer. The general-purpose image capturing device can obtain an omnidirectional image, namely an image in all directions, by combining the obtained images. Each of the special image capturing device and the general-purpose image capturing device generates a final captured image by stitching a plurality of imaging results together by image processing (stitching processing). The optical centers of the image capturing devices 10 for obtaining a plurality of imaging results may be the same.

Figure 11:
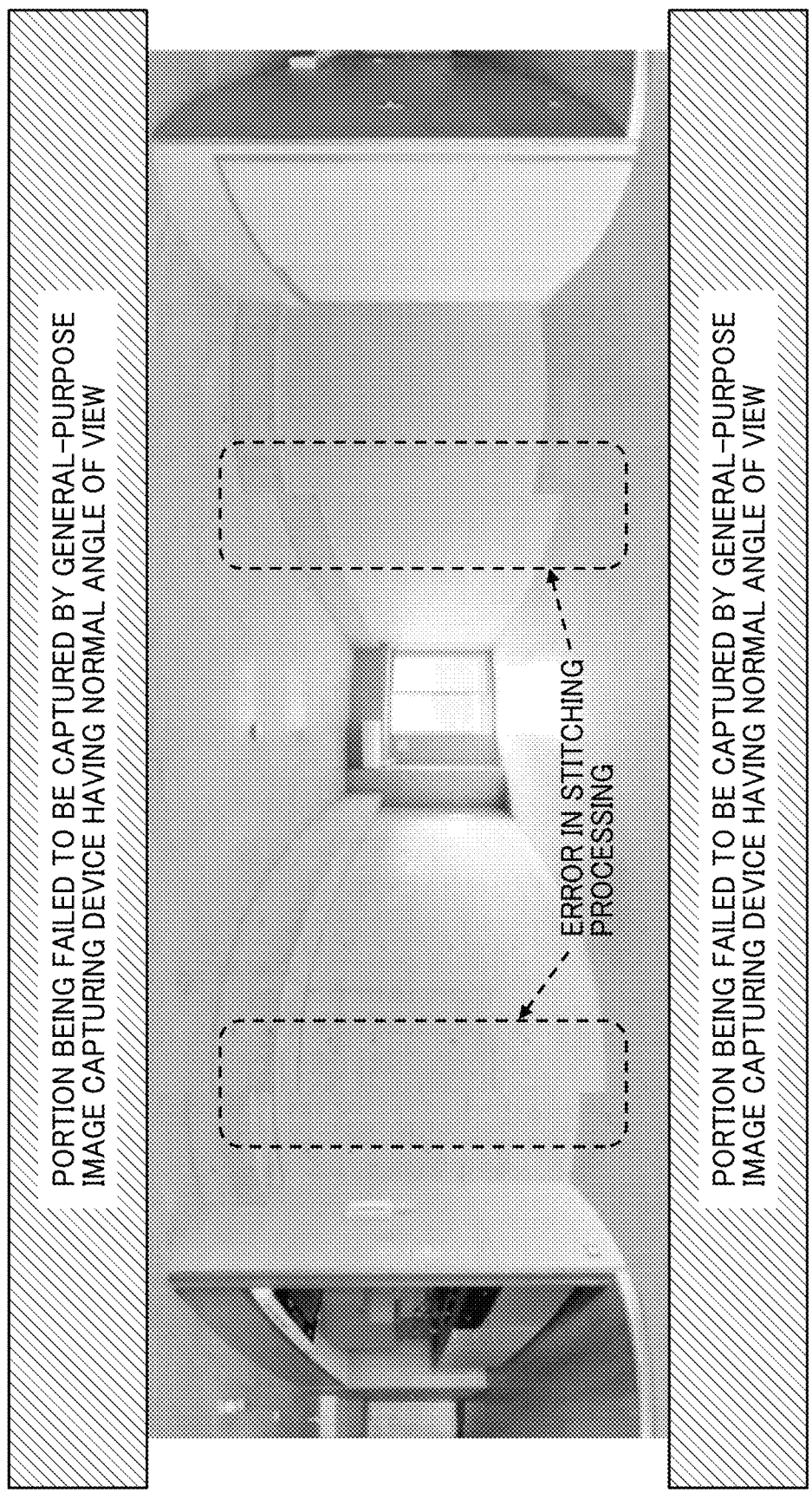
FIG. 11 is a diagram illustrating an example of a captured image captured by a general-purpose image capturing device according to the exemplary embodiment of the present disclosure.

FIG. 11 is a diagram illustrating an example of a captured image captured by a general-purpose image capturing device. FIG. 11 illustrates a captured image obtained in a case that a photographer holds the general-purpose image capturing device as illustrated in FIG. 10B in his or her hand and performs image capturing by rotating. Since the general-purpose image capturing device has a small angle of view (generally 100 degrees or less), the upper and lower poles are failed to be captured as illustrated in FIG. 11. In addition, depending on the rotation of the photographer, the position of the optical center of the image capturing device is shifted to cause disparity at the time of image capturing, and an unnatural error such as an unnatural seam is likely to occur in the stitching processing. For this reason, the special image capturing device as illustrated in FIG. 10A is preferably applied to the image capturing device 10 according to the present embodiment, though both of the special image capturing device and the general-purpose image capturing device as illustrated in FIG. 10A and FIG. 10B, respectively, are applicable. The image processing system 1 using such a special image capturing device (omnidirectional imaging device) as illustrated in FIG. 10A can use a natural high-quality spherical image without a defect as an image used for a virtual tour that is desired to have a quality acceptable for an advertisement. In the following description, it is assumed that the image capturing device 10 is a special image capturing device (omnidirectional imaging device).

Overview of Operation of Server

An overview of operation performed by the server 50 is described below with reference to FIGS. 12A to 12C. FIGS. 12A to 12C are schematic diagrams illustrating an example of operation performed by a server. FIGS. 12A to 12C illustrate a relationship between an image capturing position for a captured image captured by the image capturing device 10 and a path for associating a plurality of captured images.

The server 50 estimates an image capturing position (FIG. 12A) of a captured image obtained from the image capturing device 10 by, for example, visual Simultaneous Localization and Mapping (SLAM) or Structure from motion (SfM).

As illustrated in FIG. 12B, a result of image capturing position estimation is expressed as relative positions of image capturing positions of a plurality of captured images. In addition, result of image capturing position estimation is expressed in a manner that each image capturing position is represented by one coordinate system.

In addition to estimating the image capturing position, the server 50 can restore a route along which the user moved during captured images were captured, and can restore an order and a route along which the image capturing at each image capturing position was performed. The server 50 generates a path (tour path) based on the estimated image capturing position and the route along which the user moved at the time of image capturing. The tour path indicates a connection relationship between a plurality of captured images on a tour image. As illustrated in FIG. 12C, the captured images captured at the estimated image capturing positions are connected to each other so that traveling between the connected captured images can be performable, and a virtual tour using the captured images can be created.

Hardware Configuration

Figure 13:
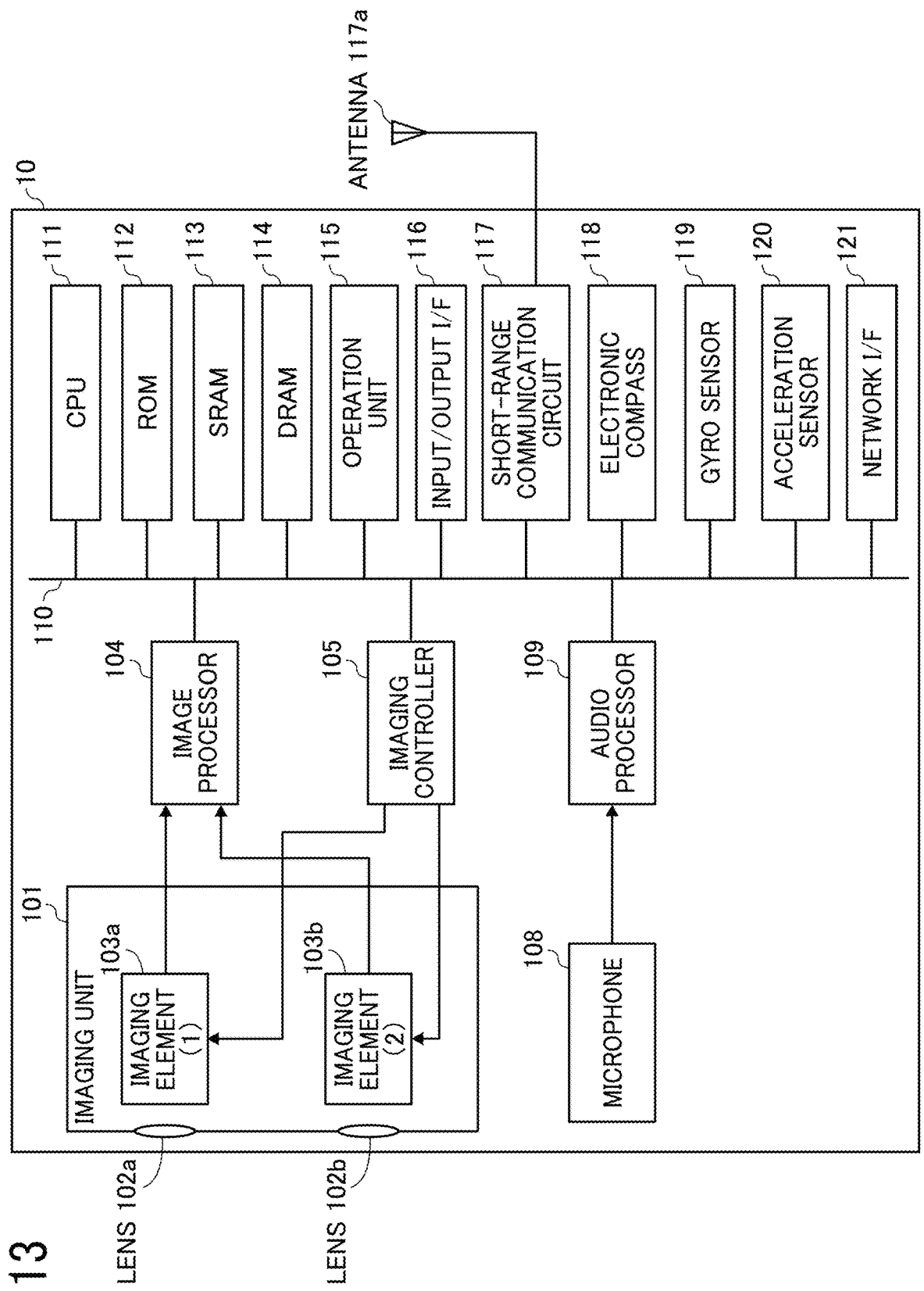
FIG. 13 is a block diagram illustrating an example of a hardware configuration of the image capturing device according to the exemplary embodiment of the disclosure.
Figure 14:
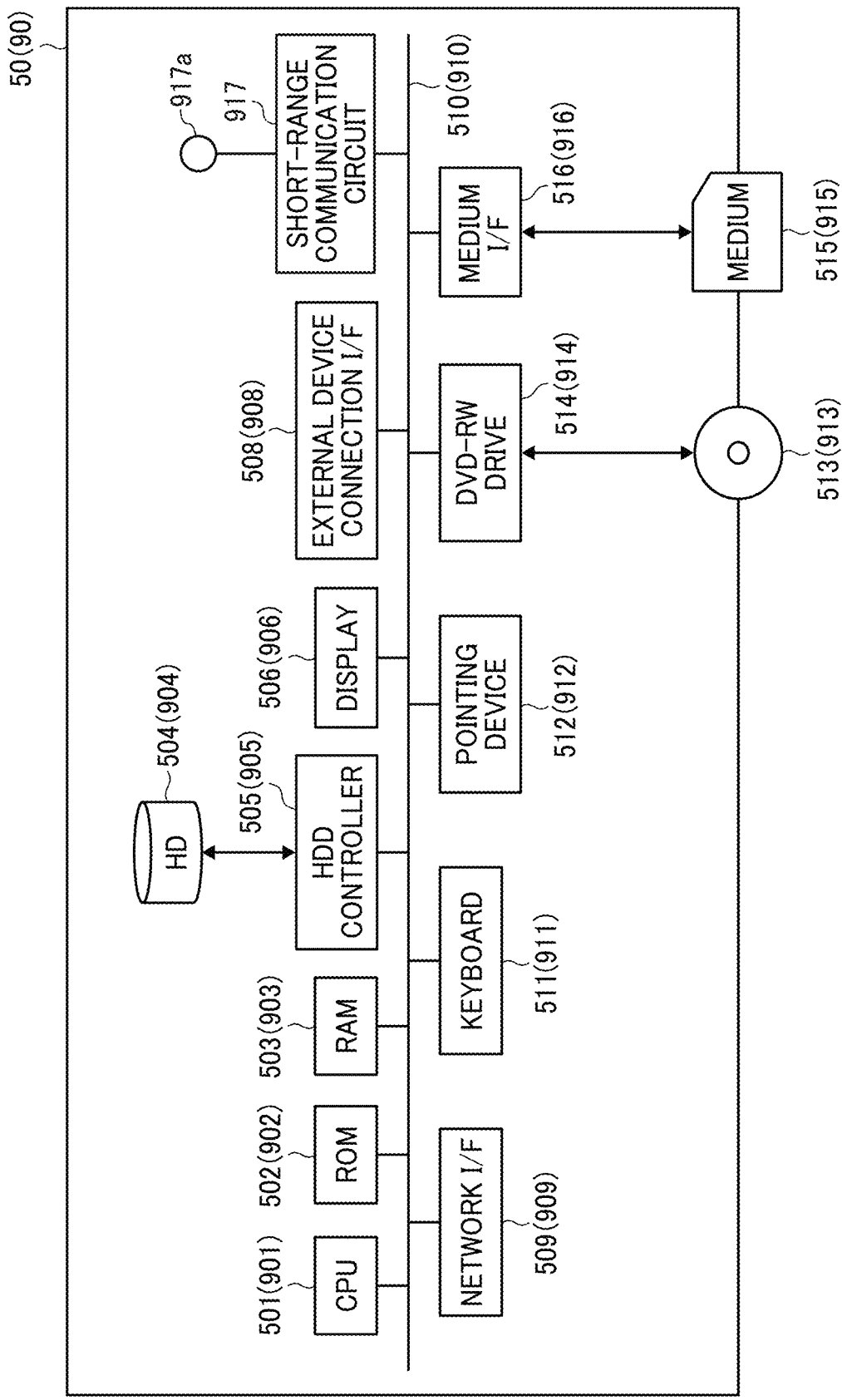
FIG. 14 is a block diagram illustrating an example of a hardware configuration of each of a server and a communication terminal according to the exemplary embodiment of the disclosure.

Referring to FIGS. 13 and 14, hardware configurations of each apparatus, device, and terminal of the image processing system according to the exemplary embodiment are described. In the hardware configurations illustrated in FIG. 13 and FIG. 14, components or elements may be added or deleted as appropriate.

Hardware Configuration of Image Capturing Device

Referring to FIG. 13, a hardware configuration of the image capturing device 10 according to the present embodiment is described. FIG. 13 is a block diagram illustrating an example of a hardware configuration of an image capturing device according to the present embodiment. In the following description of the present embodiment, the image capturing device 10 that is a spherical (omnidirectional) image capturing device having two imaging elements is used. However, the image capturing device 10 may have more than two imaging elements. In addition, the image capturing device 10 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the image capturing device 10.

As illustrated in FIG. 13, the image capturing device 10 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, an operation unit 115, an input/output interface (I/F) 116, a short-range communication circuit 117, an antenna 117a for the short-range communication circuit 117, an electronic compass 118, a gyro sensor 119, an acceleration sensor 120, and a network I/F 121.

The imaging unit 101 includes optical systems (wide-angle lenses or so-called fish-eye lenses) 102a and 102b (collectively referred to as lens 102 unless they need to be distinguished from each other), each having an angle of view of equal to or greater than 180 degrees so as to form a hemispherical image. The imaging unit 101 further includes two imaging elements 103a and 103b corresponding to the lenses 102a and 102b respectively. In the description of the present embodiment, a combination of a single optical system and a single imaging element is referred to as an imaging optical system, and the image capturing device 10 can be implemented by arranging two imaging optical systems so as to face each other. The image capturing device 10 may be implemented by using two or more imaging optical systems. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the lenses 102a and 102b into electric signals to output image data. The timing generation circuit generates horizontal or vertical synchronization signals, pixel clocks and the like for the imaging sensor. Various commands and parameters for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an internet integrated circuit (I2C) bus. The image processor 104, the imaging controller 105, and the audio processor 109 are each connected to the CPU 111 via a bus 110. Furthermore, the ROM 112, the SRAM 113, the DRAM 114, the operation unit 115, the input/output I/F 116, the short-range communication circuit 117, the electronic compass 118, the gyro sensor 119, the acceleration sensor 120, and the network IF 121 are also connected to the bus 110.

The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The image controller 105 functions as a master device while each of the imaging elements 103a and 103b functions as a slave device, and the image controller 105 sets commands in the group of registers of each of the imaging elements 103a and 103b through the I2C bus. The image controller 105 receives commands from the CPU 111. In addition, the image controller 105 obtains status data of the group of registers of each of the imaging elements 103a and 103b through the I2C bus and transmits the status data to the CPU 111.

The image controller 105 instructs the imaging elements 103a and 103b to output the image data at a time when the shutter button of the operation unit 115 is pressed. In some cases, the image capturing device 10 displays a preview image on a display (e.g., a display of an external terminal such as a smartphone that performs short-range communication with the image capturing device 10 through the short-range communication circuit 117) or displays a moving image (movie). In case of displaying moving image, the image data is continuously output from the imaging elements 103*a* and 103*b* at a predetermined frame rate (frames per second).

Furthermore, the image controller 105 operates in conjunction with the CPU 111 to synchronize the output timings of image data between the imaging elements 103*a* and 103*b*. In the present embodiment, the image capturing device 10 does not include a display unit (display). However, in some embodiments, the image capturing device 10 may include a display. The microphone 108 converts sound into audio data (signals).

The audio processor 109 obtains the audio data from the microphone 108 through an I/F bus and performs predetermined processing on the audio data.

The CPU 111 controls entire operation of the image capturing device 10, for example, by performing predetermined processing.

The ROM 112 stores various programs for execution by the CPU 111. Each of the SRAM 113 and the DRAM 114 operates as a work memory to store programs to be executed by the CPU 111 or data being currently processed. More specifically, in one example, the DRAM 114 stores image data currently processed by the image processor 104 and data of the equirectangular projection image on which processing has been performed.

The operation unit 115 collectively refers to various operation keys, a power switch, the shutter button, and a touch panel having functions of both displaying information and receiving input from a user, which can be used in combination. The user operates the operation unit 115 to input various image capturing (image capturing) modes or image capturing (image capturing) conditions.

The input/output I/F 116 collectively refers to an interface circuit such as a Universal Serial Bus (USB) I/F that allows the image capturing device 10 to communicate data with an external medium such as an SD card or an external personal computer. The input/output I/F 116 supports at least one of wired and wireless communications. The data of the equirectangular projection image, which is stored in the DRAM 114, is stored in the external medium via the input/output I/F 116 or transmitted to an external terminal (apparatus) via the input/output I/F 116, as appropriate.

The short-range communication circuit 117 communicates data with the external terminal (apparatus) via the antenna 117*a* of the image capturing device 10 by short-range wireless communication such as near field communication (NFC), BLUETOOTH (registered trademark), and Wi-Fi. The short-range communication circuit 117 transmits the data of equirectangular projection image to an external terminal (apparatus).

The electronic compass 118 calculates an orientation of the image capturing device 10 from the Earth's magnetism to output orientation information. This orientation information is an example of related information, which is metadata described in compliance with Exchangeable Image Format (Exif). This information is used for image processing such as image correction of captured images. The related information also includes a date and time when the image is captured by the image capturing device 10, and a data size of the image data. The gyro sensor 119 detects the change in tilt of the image capturing device 10 (roll, pitch, yaw) with movement of the image capturing device 10. The change in angle is one example of related information (metadata) described in compliance with Exif. This information is used for image processing such as image correction of captured images. The acceleration sensor 120 detects acceleration in three axial directions. The image capturing device 10 calculates position (an angle with respect to the direction of gravity) of the image capturing device 10, based on the acceleration detected by the acceleration sensor 120. With the acceleration sensor 120, the image capturing device 10 can improved accuracy of image correction. The network I/F 121 is an interface for performing data communication, via such as a router, using the communication network 100 such as the Internet.

Hardware Configuration of Server

Referring to FIG. 14, a hardware configuration of the server 50 according to the present embodiment is described. FIG. 14 is a block diagram illustrating an example of a hardware configuration of a server according to the present embodiment of the disclosure. Each of the components of the hardware configuration of the server 50 is denoted by a reference numeral in 500 series. The server 50 is implemented by a computer, and as illustrated in FIG. 14, includes a CPU 501, a ROM 502, a RAM 503, a hard disk (HD) 504, a hard disk drive (HDD) controller 505, a display 506, an external device connection I/F 508, a network I/F 50), a bus line 510, a keyboard 511, a pointing device 512, a digital versatile disk Rewritable (DVD-RW) drive 514, and a medium I/F 516.

The CPU 501 controls entire operation of the server 50. The ROM 502 stores programs such as an initial program loader (IPL) used for driving the CPU 501. The RAM 503 is used as a work area for the CPU 501. The HD 504 stores various types of data such as a program. The HDD controller 505 controls reading or writing of various types of data to or from the HD 504 under control of the CPU 501. The display 506 displays various information such as a cursor, menu, window, characters, or image. In one example, the display 506 is a touch panel display provided with an input device. The external device connection I/F 508 is an interface for connecting various external devices. Examples of the external devices include, but are not limited to, a USB memory. The network I/F 509 is an interface that controls communication of data with an external device through the communication network 100. The bus line 510 is, for example, an address bus or a data bus, which electrically connects the elements such as the CPU 501 illustrated in FIG. 14.

The keyboard 511 is an example of an input device including a plurality of keys for inputting characters, numerical values, various instructions, and the like. The pointing device 512 is an example of an input device that allows a user to select or execute a specific instruction, select a target for processing, or move a cursor being displayed. The input device is not limited to the keyboard 511 and the pointing device 512, and may be a touch panel, a voice input device, or the like. The DVD-RW drive 514 controls reading or writing of various types of data to or from a DVD-RW 513, which is an example of a removable recording medium. The removable recording medium is not limited to the DVD-RW and may be a digital versatile disk-recordable (DVD-R), or a BLU-RAY (registered trademark) disc (BLU-RAY disk), for example. The medium I/F 516 controls reading or writing (storing) of data from or to a storage medium (recording medium) 515 such as a flash memory.

Hardware Configuration of Communication Terminal

FIG. 14 is a block diagram illustrating an example of a hardware configuration of the communication terminal 90. Each hardware component of the hardware configuration of the communication terminal 90 is denoted by a reference numeral in 900 series. The communication terminal 90 is implemented by a computer and has the same configuration as that of the server 50 as illustrated in FIG. 14, and thus the description of each of the elements of the hardware configuration is omitted. The communication terminal 90 includes a short-range communication circuit 917 and an antenna 917a of the short-range communication circuit 917 in addition to the same configuration as the server 50. The short-range communication circuit 917 is a communication circuit that communicates in compliance with, for example, a Near Field Communication (NFC) or the BLUETOOTH.

Each of the above-described control programs may be recorded in a file in a format installable or executable on a computer-readable recording medium for distribution. Examples of the recording medium include a Compact Disc Recordable (CD-R), a DVD, a BLU-RAY Disc, an SD card, and a USB memory. In addition, such recording medium may be provided in the form of a program product to users within a certain country or outside that country. For example, the server 50 implements an image processing method according to the present disclosure by executing a program according to the present disclosure.

Functional Configuration

Figure 15:
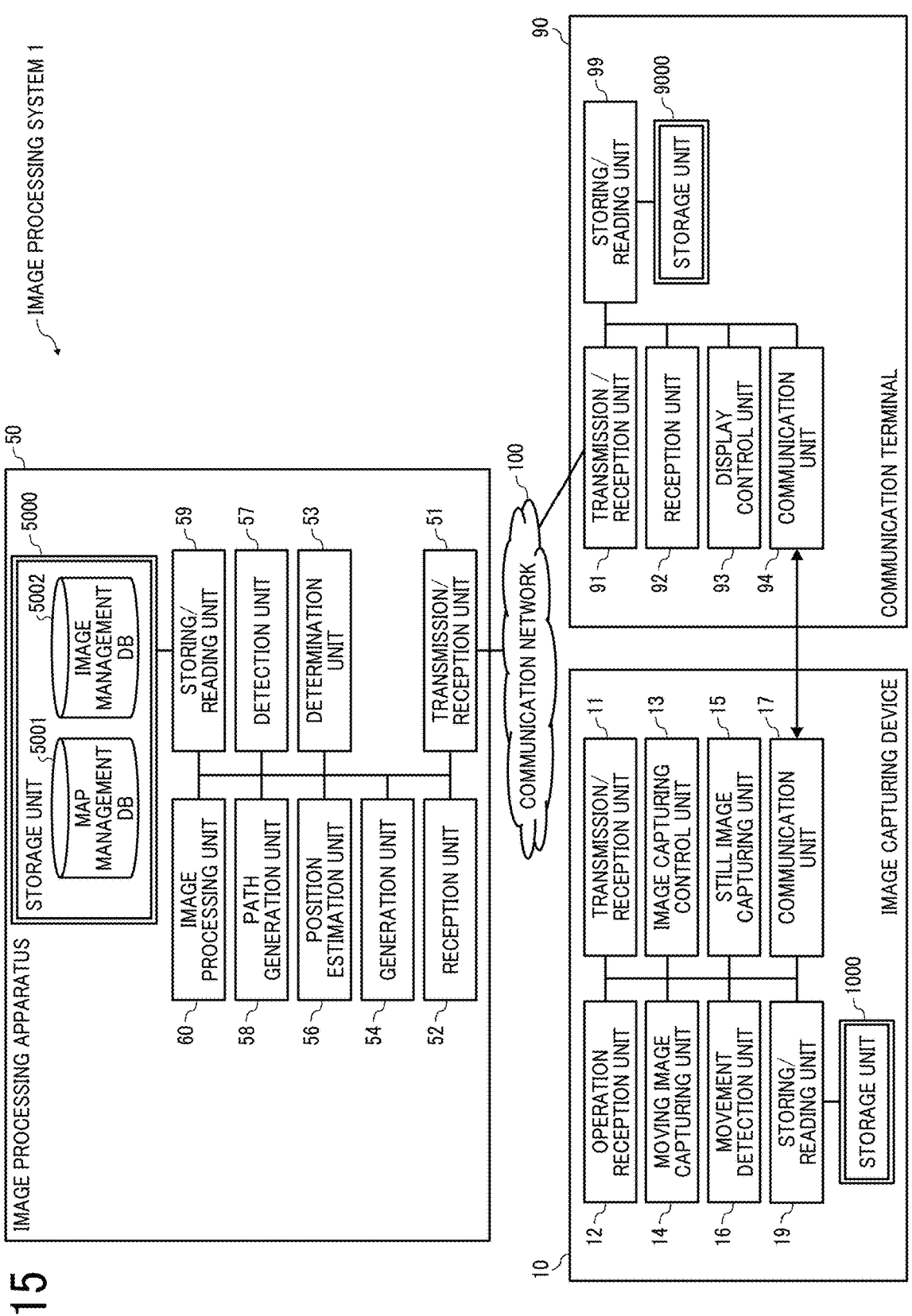
FIG. 15 is a block diagram illustrating an example of a functional configuration of the image processing system according to the exemplary embodiment of the disclosure.

Referring to FIG. 15, a functional configuration of the image processing system according to the present embodiment is described. FIG. 15 is a block diagram illustrating an example of a functional configuration of the image processing system. FIG. 15 illustrates a part of apparatuses and terminals of FIG. 1, which are related to processing or operation to be described below.

Functional Configuration of Image Capturing Device

Referring to FIG. 15, a functional configuration of the image capturing device 10 according to the embodiment is described. The image capturing device 10 includes a transmission/reception unit 11, an operation reception unit 12, an image capturing control unit 13, a moving image capturing unit 14, a still image capturing unit 15, a movement detection unit 16, a communication unit 17, and a storing/reading unit 19. Each of the above-mentioned units is a function that is implemented by operating any one or more of the elements illustrated in FIG. 13 according to instructions from the CPU 111, which is illustrated in FIG. 13, executing a control program for an image capturing device, which is expanded from the SRAM 113 to the DRAM 114. The image capturing device 10 further includes a storage unit 1000, which is implemented by the ROM 112, the SRAM 113, or the DRAM 114 illustrated in FIG. 13. The storage unit 1000 stores a Globally Unique Identifier (GUID) identifying the own device.

The transmission/reception unit 11 is an example of a transmission device and a reception device, implemented by processing of the CPU 11I and transmits or receives various types of data or information to or from another device or terminal. The transmission/reception unit 11 communicates data with another device or terminal through the communication network 100 via the network I/F 121.

The operation reception unit 12 is implemented by processing of the CPU 111 with respect to the operation unit 115, which is illustrated in FIG. 13, and receives an operation for various types of selection or input performed by a user who is a photographer.

The image capturing control unit 13 is implemented by the imaging unit 101, the image processor 104, and the imaging controller 105, which are illustrated in FIG. 13, each operating according to the instructions of the CPU 111. The image capturing control unit 13 captures an image of a subject such as surroundings (for example, scenery) to obtain captured image data. For example, the image capturing control unit 13 performs image capturing by switching between moving image capturing by the moving image capturing unit 14 and still image capturing by the still image capturing unit 15 in a time division manner.

The moving image capturing unit 14 is implemented by processing of the CPU 11 with respect to the imaging unit 101, the image processor 104, and the imaging controller 105, which are illustrated in FIG. 13, and performs moving image capturing by the image capturing device 10. For example, the moving image capturing unit 14 captures a moving image captured while moving or being moved in a predetermined site, which is a structure such as a real estate property or a space in which a structure is arranged. The moving image capturing unit 14 captures a moving image in low-resolution continuous frames while the photographer holding the image capturing device 10 is moving, and stores the captured image data in the storage unit 1000. For example, the moving image capturing unit 14 captures a moving image when a photographer holding the image capturing device 10 moves from a first point to a second point in a real estate property that is a predetermined site.

The still image capturing unit 15 is implemented by processing of the imaging unit 101, which is illustrated in FIG. 13, captures an image of a subject such as surroundings (for example, scenery), and captures a still image by the image capturing device 10. For example, the still image capturing unit 15 captures a plurality of still images each of which is captured at a corresponding image capturing position in a predetermined site, which is a structure such as a real estate property or a space in which a structure is arranged. For example, the still image capturing unit 15 captures a still image (photograph) with a resolution greater than the moving image captured by the moving image capturing unit 14, and stores the captured image data in the storage unit 1000. The still image captured by the still image capturing unit 15 may be an image of one frame, or may be a high dynamic range (HDR) image obtained by combining a plurality of images.

In addition, the moving image capturing is performed at the time of moving in the predetermined site, and the still image capturing is performed at the time of stopping in the predetermined site.

An image capturing specification of moving image capturing and an image capturing specification of still image capturing are different from each other depending on the image capturing purposes. In a case of moving image capturing, continuous images (continuous frames) at a high frame rate are acquired to be used to estimate a position. However, high resolution and a color layer of the captured image are not essential, and low resolution and a gray scale are sufficient. In a case of still image capturing, continuous frames are not necessarily acquired, but image capturing with high resolution, color information (RGB), and a high dynamic range is used. It is preferable that the still image captured by the still image capturing unit 15 have a high resolution equal to or greater than the 4K resolution, for example, for the purpose of obtaining an image to be viewed. On the other hand, a moving image captured by the moving image capturing unit 14 is an image used for estimating a position, and, because it is sufficient that a subject captured in the moving image is identifiable, the moving image is an image having a resolution less than that of a still image. The moving image may be, for example, about 480p or less. The image capturing device 10 can reduce the total data amount in capturing an image for a tour by image capturing of low-resolution moving image. In the description of the present embodiment, capturing an image for a tour may be referred to as a tour image capturing.

The movement detection unit 16 is implemented by processing of the CPU 111 with respect to the gyro sensor 119 and the acceleration sensor 120, which are illustrated in FIG. 13, and detects a movement state of the image capturing device 10. The movement detection unit 16 detects, for example, whether a photographer holding the image capturing device 10 is moving (in a moving state) or stationary (in a stationary state) during image capturing performed with the image capturing device 10.

The communication unit 17 is implemented by processing of the CPU 111 with respect to the input/output I/F 116 or the short-range communication circuit 117, which is illustrated in FIG. 13, and transmits or receives various types of data to or from another device or terminal. The communication unit 17 performs data communication with the communication terminal 90 via various cables using, for example, the input/output I/F 116. In addition, the communication unit 17 performs data communication with the communication terminal 90 by short-range wireless communication technology using the short-range communication circuit 117.

The storing/reading unit 19 is implemented by processing of the CPU 111 and stores various types of data (or information) in the storage unit 1000 or reads various types of data (or information) from the storage unit 1000. The storage unit 1000 also stores image data captured by the moving image capturing unit 14 and the still image capturing unit 15. The image data stored in the storage unit 1000 is associated with an image capturing time of the captured image as metadata.

Functional Configuration of Server

Referring to FIG. 15, a functional configuration of the server 50 according to the present embodiment is described. The server 50 includes a transmission/reception unit 51, a reception unit 52, a determination unit 53, a generation unit 54, a position estimation unit 56, a path generation unit 58, an image processing unit 60, and a storing/reading unit 59. Each of these units is a function that is implemented by operating any of the elements illustrated in FIG. 14 with instructions from the CPU 501, which is illustrated in FIG. 14, according to the control program for a server expanded from the HD 504 to the RAM 503. The server 50 further includes a storage unit 5000 that is implemented by the ROM 502, the RAM 503, and the HD 504 illustrated in FIG. 14.

The transmission/reception unit 51 is an example of a transmission unit and a reception unit, is implemented by processing of the CPU 501 with respect to the network I/F 509, which is illustrated in FIG. 14, and transmits or receives various types of data or information to or from another device or terminal through the communication network 100. For example, the transmission/reception unit 51 receives (acquires) a moving image captured by the image capturing device 10 from the image capturing device 10 or the communication terminal 90. Further, the transmission/reception unit 51 receives (acquires) a still image captured by the image capturing device 10 from the image capturing device 10 or the communication terminal 90, for example.

The reception unit 52 is implemented by processing of the CPU 501 with respect to the keyboard 511 or the pointing devices 512, which is illustrated in FIG. 14, and receives various types of selection or input from users.

The determination unit 53 is implemented by processing of the CPU 501 and performs various determinations.

The generation unit 54 is implemented by processing of the CPU 501 and generates a display screen, for example.

The position estimation unit 56 is implemented by processing of the CPU 501 and estimates a relative image capturing position for a still image acquired from the image capturing device 10 based on the moving image acquired from the image capturing device 10. The position estimation unit 56 estimates relative positions of the still images, which are still images captured, based on the moving image, which is a low-resolution continuous frame, using a method such as visual SLAM or SfM. The method such as visual SLAM or SfM can calculate a position of a feature point on an image, a position of a camera, and a parameter from a plurality of images. The calculated position is relative. A reference position is used in order to obtain an absolute position.

The path generation unit 58 is implemented by processing of the CPU 501 and generates a path indicating a connection relationship between the plurality of still images based on the image capturing position estimated by the position estimation unit 56. For example, the path generation unit 58 generates a path associated with each of nearest still images among the plurality of still images based on the estimated image capturing position.

The image processing unit 60 is implemented by processing of the CPU 501 and performs image processing for generating a tour image for a virtual tour based on the image capturing position estimated by the position estimation unit 56. The image processing unit 60 generates, for example, a tour image that is a processed image including the plurality of still images associated with each other based on the estimated image capturing position. The image processing unit 60 determines a position at which a still image is to be arranged in the tour image from the estimated image capturing position of the still image, an image capturing time of the still image, and a path (tour path) generated by the path generation unit 58.

The storing/reading unit 59 is implemented by processing of the CPU 501 and stores various types of data (or information) in the storage unit 5000 or reads various types of data (or information) from the storage unit 5000.

A map management database (DB) 5001 and an image management DB 5002 are included in the storage unit 1000. The map management DB 5001 stores maps indicating an interior space of a structure such as a real estate property or a building or a structure such as construction or civil engineering, which is to be managed. The image management DB 5002 includes an image management table, which is described later. The storage unit 5000 stores a tour image generated by the image processing unit 60.

Functional Configuration of Communication Terminal

Referring to FIG. 15, a functional configuration of the communication terminal 90 according to the present embodiment is described. The communication terminal 90 includes a transmission/reception unit 91, a reception unit 92, a display control unit 93, a communication unit 94, and a storing/reading unit 99. Each of these units is a function that is implemented by operating any of the elements illustrated in FIG. 15 with instructions from the CPU 901, which is illustrated in FIG. 15, according to the control program for a communication terminal expanded from the HD 904 to the RAM 903. The communication terminal 90 also includes a storage unit 9000 implemented by the ROM 902, the RAM 903, and the HD 904 illustrated in FIG. 15.

The transmission/reception unit 91 is an example of a transmission unit and a reception unit, is implemented by processing of the CPU 901 with respect to the network I/F 909, which is illustrated in FIG. 14, and transmits or receives various types of data or information to or from another device or terminal through the communication network 100.

The reception unit 92 is implemented by processing of the CPU 901 with respect to the keyboard 911 or the pointing device 912, which is illustrated in FIG. 14, and receives various types of selection or input from users.

The display control unit 93 is implemented by processing of the CPU 901, which is illustrated in FIG. 14, controls the display 906 to display various screens including various images or texts. The display control unit 93 accesses the server 50 using, for example, a web browser or a dedicated application, and causes the display 906 to display an image corresponding to data distributed from the server 50.

The communication unit 94 is implemented by processing of the CPU 901 with respect to the external device connection I/F 908 or the short-range communication circuit 917, which is illustrated in FIG. 14, and transmits or receives various types of data to or from another device or terminal. The communication unit 94 performs data communication with the image capturing device 10 via various cables using, for example, the external device connection I/F 908. In addition, the communication unit 94 performs data communication with the image capturing device 10 according to the short-range wireless communication technology using the short-range communication circuit 917.

The storing/reading unit 99 is implemented by processing of the CPU 90I and stores various types of data (or information) in the storage unit 9000 or reads various types of data (or information) from the storage unit 9000.

FIG. 16 is a schematic diagram illustrating an example of the image management table according to the present embodiment.

The image management table is a table for managing a captured image captured by the image capturing device 10. In the storage unit 5000 illustrated in FIG. 15, the image management DB 5002 including an image management table as illustrated in FIG. 16 is included.

In the image management table, an image capturing position, an image capturing direction, an image capturing range, a still image, an image direction, and an image range are associated with each other to be managed for each map identification information for identifying a map.

The image capturing position is managed by the map management DB 5001, and indicates a fixed image capturing position determined to be positioned with respect to the map identified by the map identification information.

The image capturing direction and the image capturing range indicate an image capturing direction and an image capturing range of a captured image captured at the fixed image capturing position.

The still image indicates the captured image captured at the fixed image capturing position, and the image direction and the image range indicate a display direction and a display range when the captured image is displayed.

The image management table may further store orientation information and an angle of view at the time of image capturing in association with each map identification information.

Figure 17:
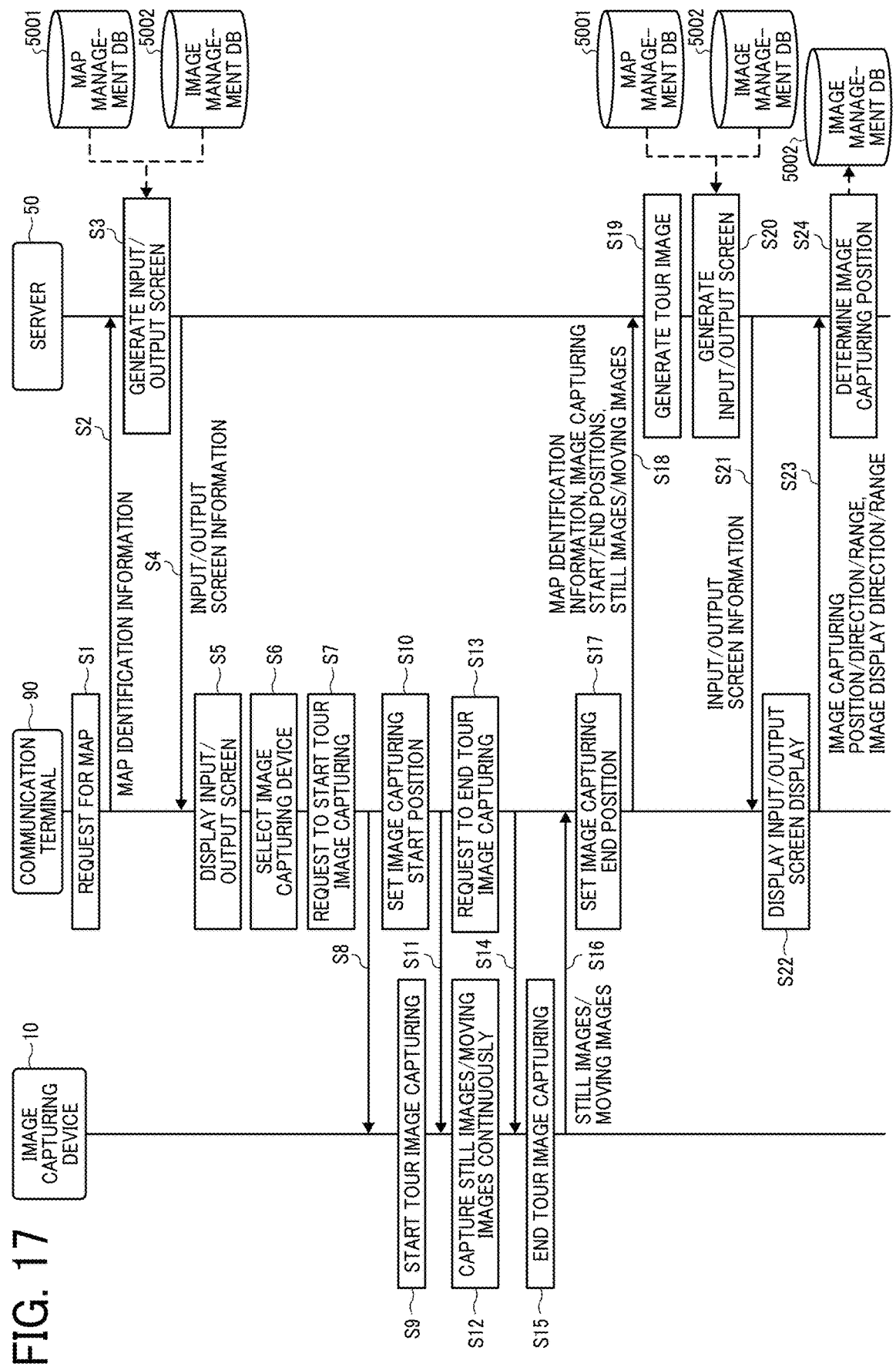
FIG. 17 is a sequence diagram illustrating an example of a process according to the exemplary embodiment of the disclosure.

FIG. 17 is a sequence diagram illustrating an example of a process according to the present embodiment.

The reception unit 92 of the communication terminal 90 receives a request for a specified map when the user inputs information specifying a map (Step S1).

The transmission/reception unit 91 transmits map identification information for identifying the specified map to the server 50, and the transmission/reception unit 51 of the server 50 receives the map identification information transmitted from the communication terminal 90 (Step S2).

The storing/reading unit 59 reads map information from the map management DB 5001 using the map identification information as a search key, and reads various types of information illustrated in FIG. 16 from the map management DB 5001 using the map identification information as a search key. The generation unit 54 generates an input/output screen based on the various types of information read by the storing/reading unit 59 (Step S3). Step S3 is an example of a step of generating an input/output screen. The input/output screen may be referred to as an input-and-output screen. The map information includes information indicating the number of floors of structure such as real estate property or a building, and orientation information of the map.

The transmission/reception unit 51 transmits input/output screen information indicating the input/output screen generated by the generation unit 54 to the communication terminal 90, and the transmission/reception unit 91 of the communication terminal 90 receives the input/output screen information transmitted from the server 50 (Step S4).

The display control unit 93 displays the input/output screen based on the received input/output screen information on the display 906 (Step S5).

When the user inputs information for specifying an image capturing device, the reception unit 92 receives selection of the image capturing device (Step S6).

When the user performs an operation for instructing to start tour image capturing, the reception unit 92 receives a request to start tour image capturing (Step S7). In the description of the present embodiment, the request to start tour image capturing may be referred to as a tour image capturing start request.

The communication unit 94 transmits the tour image capturing start request to the image capturing device 10 selected in Step S4, and the communication unit 17 of the image capturing device 10 receives the tour image capturing start request transmitted from the communication terminal 90 (Step S8).

The image capturing control unit 13 starts tour image capturing based on the tour image capturing start request (Step S9).

When the user performs an operation for setting an image capturing start position on the input/output screen, the reception unit 92 of the communication terminal 90 receives the setting of the image capturing start position (Step S10).

The communication unit 94 transmits setting completion information indicating completion of setting of the image capturing start position to the image capturing device 10, and the communication unit 17 of the image capturing device 10 receives the setting completion information transmitted from the communication terminal 90 (Step S11).

After the setting completion information is received, the operation reception unit 12 receives an image capturing instruction when the user performs an operation for the image capturing instruction. Based on the image capturing instruction, the image capturing control unit 13 causes the still image capturing unit 15 and the moving image capturing unit 14 to continuously capture still images/moving images (Step S12).

When the user performs an operation for instructing to end the image capturing, the reception unit 92 of the communication terminal 90 receives a request to end tour image capturing (Step S13). In the description of the present embodiment, the request to end a tour image capturing may be referred to as a tour image capturing end request.

The communication unit 94 transmits the tour image capturing end request to the image capturing device 10, and the communication unit 17 of the image capturing device 10 receives the tour image capturing end request transmitted from the communication terminal 90 (Step S14).

The image capturing control unit 13 ends the tour image capturing based on the tour image capturing end request (Step S15).

The communication unit 17 transmits the still image/moving image captured in Step S12 to the server 50, and the communication unit 94 of the communication terminal 90 receives the still images/moving images transmitted from the image capturing device 10 (Step S16).

When the user performs an operation for setting an image capturing end position on the input/output screen, the reception unit 92 receives the setting of the image capturing end position (Step S17).

The transmission/reception unit 91 transmits the map identification information, the position information indicating the image capturing start position, and the still images/moving images to the server 50, and the transmission/reception unit 51 of the server 50 receives the various types of information transmitted from the communication terminal 90 (Step S18).

The position estimation unit 56 estimates a relative image capturing position of the still image based on the received still images/moving images. The path generation unit 58 generates a path indicating a connection relationship between the plurality of still images based on the image capturing position estimated by the position estimation unit 56. The image processing unit 60 generates a tour image based on the image capturing position estimated by the position estimation unit 56 and the path generated by the path generation unit 58 (Step S19).

The storing/reading unit 59 reads map information from the map management DB 5001 using the map identification information as a search key, and reads various types of information illustrated in FIG. 16 from the map management DB 5001 using the map identification information as a search key. The generation unit 54 generates an input/output screen based on the tour image generated in Step S11 and various types of information read by the storing/reading unit 59 (Step S20).

The transmission/reception unit 51 transmits the input/output screen information indicating the input/output screen generated by the generation unit 54 to the communication terminal 90, and the transmission/reception unit 91 of the communication terminal 90 receives the input/output screen information transmitted from the server 50 (Step S21).

The display control unit 93 displays the input/output screen based on the received input/output screen information on the display 906. When the user performs an operation for changing the image capturing position/direction/range and the direction/range of the captured image on the input/output screen, the reception unit 92 receives the change (Step S22). The Step S22 is an example of a step of displaying and a step of receiving.

The transmission/reception unit 91 transmits the changed image capturing position/direction/range and the direction/range of the captured image to the server 50, and the transmission/reception unit 51 of the server 50 receives the various types of information transmitted from the communication terminal 90 (Step S23).

The storing/reading unit 59 reads the table illustrated in FIG. 16 from the map management DB 5001 using the map identification information received in Step S10 as a search key, and stores the various types of information received in Step S13 (Step S24).

In FIG. 17, communication between the image capturing device 10 and the communication terminal 90 is performed by the communication unit 17 and the communication unit 94, but in FIG. 1, when the image capturing device 10 can communicate with the communication terminal 90 via the communication network 100, communication may be performed by the transmission/reception unit 11 and the transmission/reception unit 91.

Although the generation unit 54 of the server 50 generates the input/output screen at Step S3 and Step S20 in FIG. 17, the transmission/reception unit 51 of the server 50 may transmit the various types of information and the tour image read by the storing/reading unit 59 to the communication terminal 90, and the generation unit 95 included in the communication terminal 90 may generate the input/output screen based on the various types of information and the tour image transmitted from the server 50, which is described later.

In this case, the display control unit 93 of the communication terminal 90 causes the display 906 to display the input/output screen generated by the generation unit of the communication terminal 90.

Further, the Step S22 executed by the communication terminal 90 may be executed by the server 50, or may be executed by another communication terminal that can communicate with the server 50 via the communication network 100 separately from the communication terminal 90.

Figure 18:
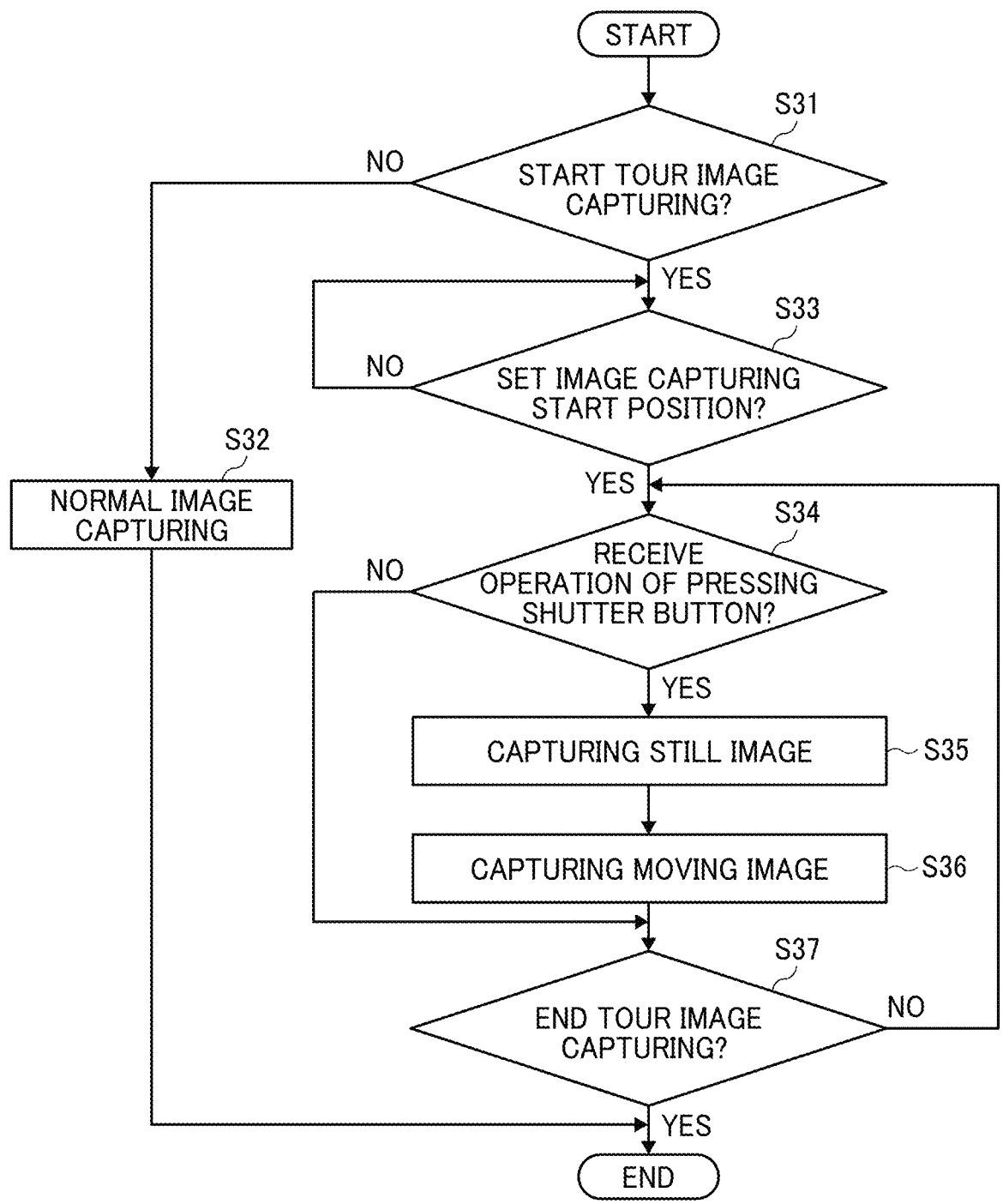
FIG. 18 is a flowchart illustrating an example of a process for capturing an image for a tour according to the exemplary embodiment of the present disclosure.

FIG. 18 is a flowchart illustrating an example of a process for capturing an image for a tour, namely a process for tour image capturing, according to the present embodiment. The process illustrated in FIG. 18 corresponds to processing of Steps S9, S12 and S15 in the sequence diagram illustrated in FIG. 17.

The following description of the process is given based on the premise that a plug-in for capturing an image for a tour, namely a plug-in for tour image capturing, is installed on the image capturing device 10. When the plug-in for tour image capturing is enabled, the image capturing device 10 can perform tour image capturing including still image capturing or moving image capturing.

The image capturing control unit 13 of the image capturing device 10 checks whether or not the communication unit 17 has received a tour image capturing start request from the communication terminal 90 (Step S31), and performs normal image capturing when the communication unit 17 has not received the tour image capturing start request (Step S32).

When the tour image capturing start request is received, the image capturing control unit 13 starts tour image capturing and checks whether the communication unit 17 receives setting completion information indicating completion of setting of an image capturing start position from the communication terminal 90 (Step S33).

When confirming that the setting completion information is received in Step S33, the image capturing device 10 automatically activates the plug-in for tour image capturing. The image capturing device 10 may automatically activate the plug-in for tour image capturing when receiving the tour image capturing start request in Step S31.

When the shutter button of the operation unit 115 is pressed after confirming that the setting completion information is received in Step S33, the operation reception unit 12 receives an image capturing instruction (Step S34). In the present embodiment, the user presses the shutter button of the operation unit 115 after confirming that the camera is located at the image capturing start position set in Step S10 in FIG. 17.

The image capturing control unit 13 causes the still image capturing unit 15 to capture a still image based on the image capturing instruction (Step S35).

After the still image capturing, the image capturing control unit 13 causes the moving image capturing unit 14 to capture a moving image (Step S36).

The image capturing control unit 13 checks whether or not the communication unit 17 has received a tour image capturing end request from the communication terminal 90 (Step S37), and if not, returns to Step S34 and checks whether or not the shutter button of the operation unit 115 has been pressed.

When receiving the tour image capturing end request in Step S37, the image capturing control unit 13 ends the tour image capturing. In the present embodiment, in the case of the flowchart illustrated in FIG. 18, the user presses the shutter button of the operation unit 115 after confirming that the camera is located at the image capturing end position in order to perform an operation for ending the tour image capturing, in Step S13 of FIG. 17. In some embodiments, after the user performs the operation for instructing to end the tour image capturing in Step S13 of FIG. 17, the user may confirm that the location is at the image capturing end position and press the shutter button of the operation unit 115.

As described above, the still images and the moving images are alternately captured, and in Step S16 illustrated in FIG. 17, the communication unit 17 can transmit to the server 50 the still images and the moving images, which are alternately captured.

When the setting completion information is not received in Step S31 after the tour image capturing is started in Step S33, the operation reception unit 12 does not receive an image capturing instruction even when the shutter button of the operation unit 115 is pressed. This prevents that image capturing is started without setting the image capturing start position.

In the normal image capturing in Step S32, w % ben the shutter button of the operation unit 115 is pressed regardless of the reception of the setting completion information, the operation reception unit 12 receives the image capturing instruction.

In addition, when the shutter button is not pressed in Step S33 even after a predetermined time has elapsed after the setting completion information is received in Step S34, the image capturing control unit 13 may end the tour image capturing.

This prevents image capturing from being started in a state where the camera is moved to a position away from the image capturing start position set in Step S10 of FIG. 17, and prevents a deviation between the set image capturing start position and the actual image capturing start position, accordingly.

In a case where the plug-in for tour image capturing is not installed when the image capturing device 10 receives the setting completion information or the start request, the display control unit 93 of the communication terminal 90 causes the display 906 to display an error screen or a plug-in installation screen. Alternatively, when the image capturing device 10 can communicate with the server 50 via the communication network 100, the image capturing device 10 may automatically download the plug-in.

In other words, since the instruction with respect to the software is transmitted to the image capturing device 10 via the communication terminal 90, settings on the image capturing device 10 are changed, and a captured image captured by the image capturing device 10 is transferred to the software, the user can perform tour image capturing by operating the communication terminal 90 without setting the image capturing device 10 each time.

Figure 19:
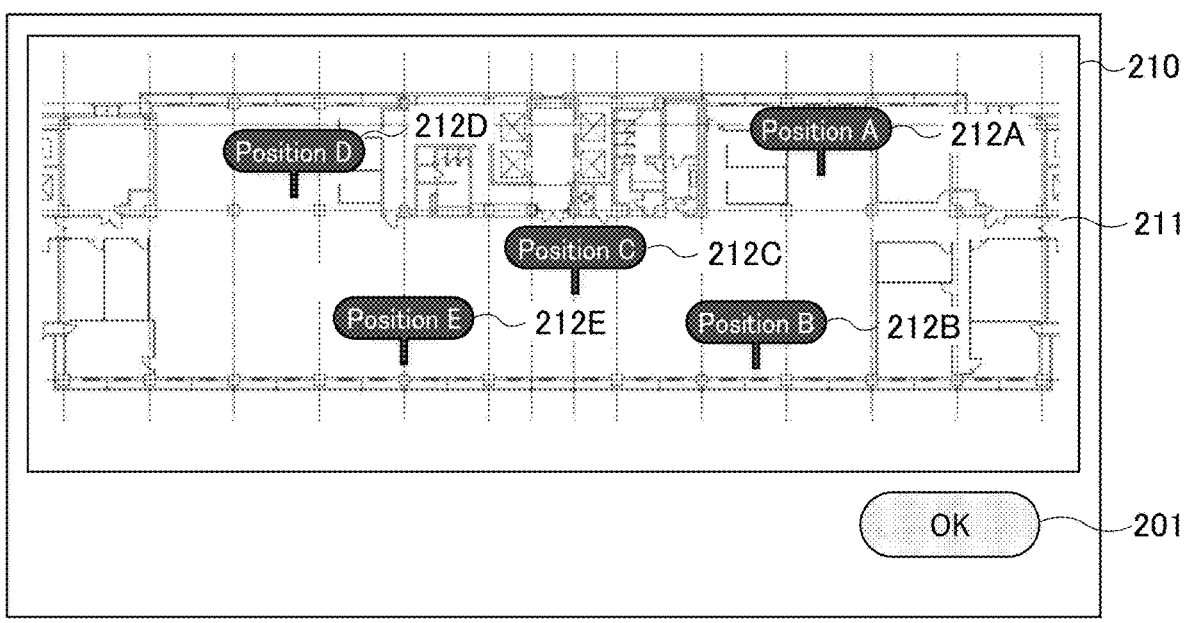
FIG. 19 is a diagram illustrating an example of an input/output screen according to the exemplary embodiment of the present disclosure.

FIG. 19 is a diagram illustrating an input/output screen according to the present embodiment.

In Step S3 of FIG. 17, the image processing unit 60 of the server 50 generates a plurality of fixed image capturing position images 212A to 212E based on a plurality of image capturing positions managed in the image management table illustrated in FIG. 16, and the generation unit 54 generates an input/output screen 200 that displays a map 211 and the plurality of fixed image capturing position images 212A to 212E indicating the fixed image capturing positions positioned with respect to the map 211 in a superimposed manner and displays a determination button 201.

Figure 20A:
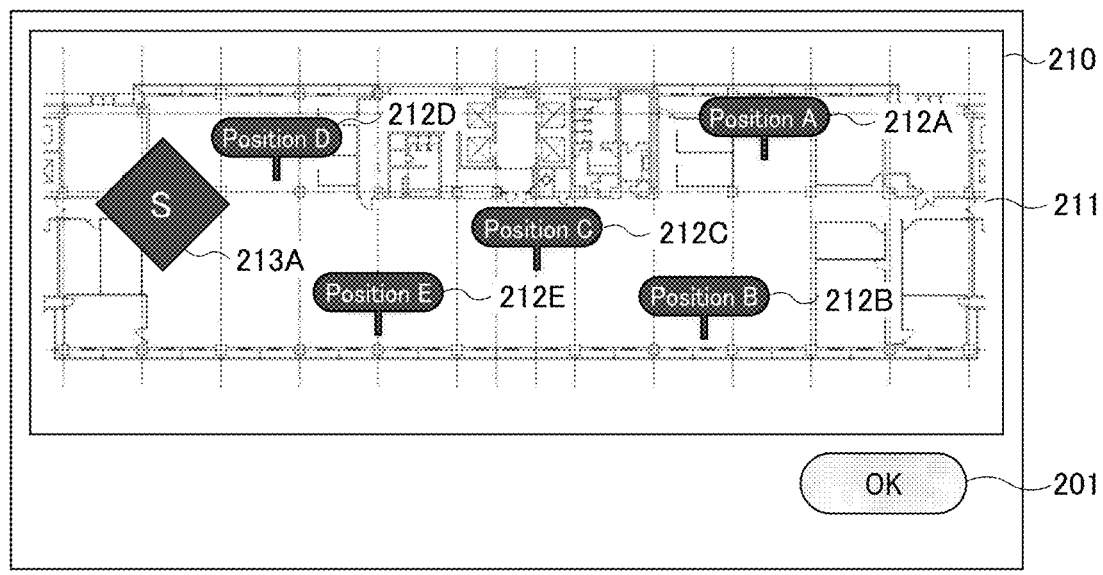
FIGS. 20A and 20B are diagrams each illustrating an example of the input/output screen for describing setting an image capturing position according to the exemplary embodiment of the present disclosure.
Figure 20B:
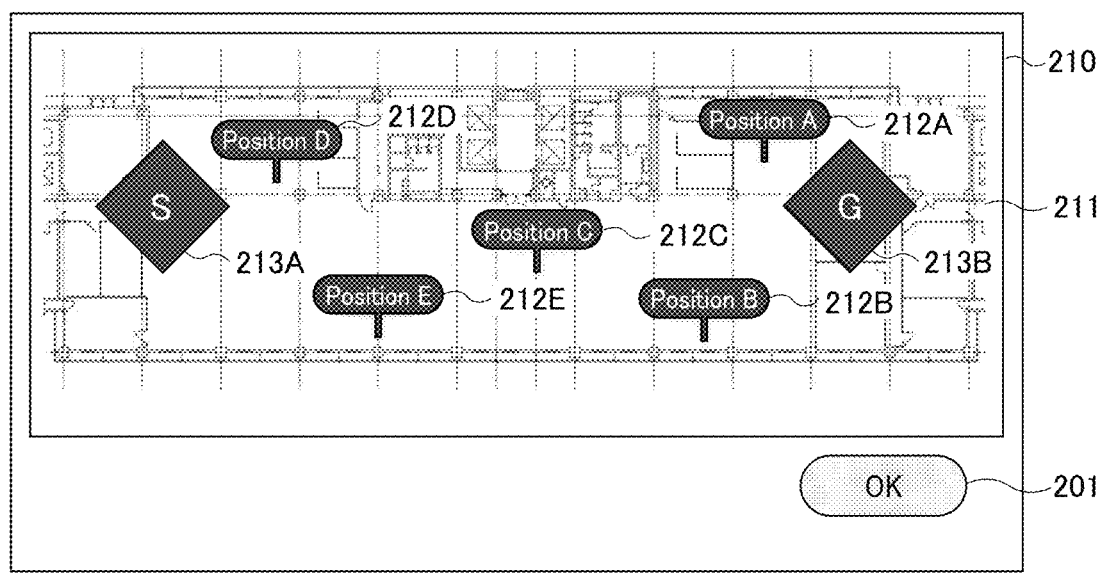

FIGS. 20A and 20B are diagrams each illustrating an example of the input/output screen 200 for describing setting an image capturing position according to the present embodiment.

FIG. 20A illustrates a state in which the user sets the image capturing start position on the input/output screen 200 in Step S10 of FIG. 17.

In FIG. 19, when the user performs a designation operation of designating a position on the map 211 displayed on the input/output screen 200, the reception unit 92 receives the designation operation, and the display control unit 93 displays an image capturing start position image 213A indicating the image capturing start position at the designated position on the map 211.

In this state, when the user operates the determination button 201, the reception unit 92 receives the setting of the image capturing start position image 213A. The image capturing start position image 213A is an example of a first position image 213 indicating a first image capturing position positioned with respect to the map 211.

FIG. 20B illustrates a state in which the user sets the image capturing end position on the input/output screen 200 in Step S17 of FIG. 17.

In FIG. 20A, when the user performs a designation operation of designating a position on the map 211 displayed on the input/output screen 200, the reception unit 92 receives the designation operation, and the display control unit 93 displays an image capturing end position image 213B indicating the image capturing end position at the designated position on the map 211.

In this state, when the user operates the determination button 201, the reception unit 92 receives the setting of the image capturing end position image 213B. The image capturing end position image 213B is an example of the first position image 213 indicating the first image capturing position positioned with respect to the map 211.

Although the image capturing start position and the image capturing end position are set by the operation of the user in FIG. 20, the image capturing start position and the image capturing end position may be preset at predetermined positions on the map 211.

In this case, when the user operates the image capturing start position image 213A or the image capturing end position image 213B on the map 211 and operates the determination button 201, the reception unit 92 receives a confirmation operation of the image capturing start position or the image capturing end position. As a result, the image capturing is prevented from being started without setting the image capturing start position, and the still image/moving image is prevented from being transmitted to the server 50 without confirming the image capturing end position, which can be forgotten by the user.

The first image capturing position positioned with respect to the map 211 may be an image capturing position other than the image capturing start position and the image capturing end position, and may be, for example, an intermediate image capturing position between the image capturing start position and the image capturing end position.

In this case, when the user performs a designation operation of designating a position on the map 211 displayed on the input/output screen 200, the reception unit 92 receives the designation operation, and the display control unit 93 displays an intermediate image capturing position image indicating an intermediate image capturing position at the designated position on the map 211. A plurality of intermediate image capturing positions may be designated, and in this case, the display control unit 93 displays a plurality of intermediate image capturing position images.

The intermediate image capturing position is useful in a case where the user desires to temporarily store the moving image and the still image that have been captured so far, due to deal with another work during the tour image capturing and also has a meaning as a temporary storage point.

The intermediate image capturing position may be one that is initially set as the image capturing end position and then changed from the image capturing end position to the intermediate image capturing position by continuing image capturing of the moving image and the still image, and in this case, another position is newly set to the image capturing end position.

Even if the first image capturing position is an image capturing position such as an intermediate image capturing position, the position of the first image capturing position with respect to the map 211 matches a position at which the user presses the shutter button of the operation unit 115 of the image capturing device 10.

Figure 21:
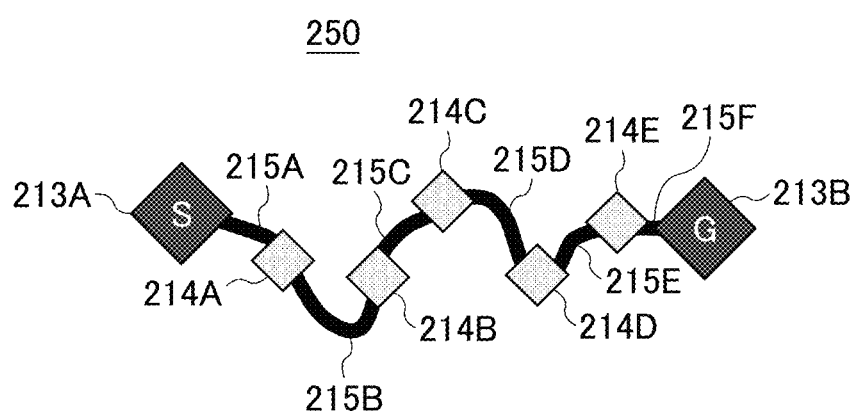
FIG. 21 is a diagram illustrating a tour image according to the exemplary embodiment of the present disclosure.

FIG. 21 is a diagram illustrating a tour image according to the present embodiment.

FIG. 21 illustrates the result of the processing of Step S19 of FIG. 17.

The position estimation unit 56 of the server 50 estimates a relative position with respect to the image capturing start position and the image capturing end position of a still image capturing position at which a still image is captured, based on the still images/moving images, the image capturing start position, and the image capturing end position received in Step S18.

The path generation unit 58 generates a path indicating a connection relationship between the image capturing start position, the image capturing end position, and the still image capturing position based on the relative position of the still image capturing position estimated by the position estimation unit 56. The path indicating the connection relationship may also be referred to as an image capturing route.

The image processing unit 60 generates a tour image 250 including the image capturing start position image 213A indicating an image capturing start position, the image capturing end position image 213B indicating an image capturing end position, still image capturing position images 214A to 214E indicating still image capturing positions, and path images 215A to 215F indicating paths.

The image processing unit 60 generates the image capturing start position image 213 and the still image capturing position image 214 in a manner that the image capturing start position image 213 and the still image capturing position image 214 can be distinguished from each other. As illustrated in the example of FIG. 21, the image processing unit 60 generates the image capturing start position image 213 and the still image capturing position image 214 in a manner that the image capturing start position image 213 is larger than the still image capturing position image 214, and that the display colors of the still image capturing position image 214 and the image capturing start position image 213 are different from each other. The image processing unit 60 may generate the image capturing start position image 213 and the still image capturing position image 214 in a manner that the shapes of the image capturing start position image 213 and the still image capturing position image 214 are different from each other.

In other words, the image processing unit 60 generates the still image capturing position images 214A to 214E and the path images 215A to 215F in a manner that each position of the still image capturing position images 214A to 214E with respect to the image capturing start position image 213A and the image capturing end position image 213B and each position of the path images 215A to 215F with respect to the image capturing start position image 213A and the image capturing end position image 213B are temporarily determined.

The path image can be generated when at least the image capturing start position image 213A, the image capturing end position image 213B, and an image capturing route through which a moving image is captured are present. Accordingly, how the photographer moved between the image capturing start position image 213A and the image capturing end position image 213B in the predetermined site such as a construction site can be grasped. There may be at least one still image capturing position image 214 in addition to the image capturing start position image 213A and the image capturing end position image 213B. There may be two or more still image capturing position images 214.

The image processing unit 60 may change the color of each of the path images 215A to 215F from a dark color to a light color from the image capturing start position image 213A to the image capturing end position image 213B, or may change the color to red at the beginning, yellow in the middle, and blue at the end.

In addition, the image processing unit 60 may increase or decrease the thickness of each of the path image 215A to the image 215F stepwise from the image capturing start position image 213A toward the image capturing end position image 213B.

Further, the image processing unit 60 may display the path images 215A to 215F in a flowing manner so that the direction can be intuitively understood from the image capturing start position image 213A to the image capturing end position image 213B, such as a "flowing arrow" or a "flowing blinker."

As described above with reference to FIG. 20, the position estimation unit 56, the path generation unit 58, and the image processing unit 60 may use an image capturing position such as an intermediate image capturing position as the first image capturing position in alternative to the image capturing start position or the image capturing end position.

Figure 22:
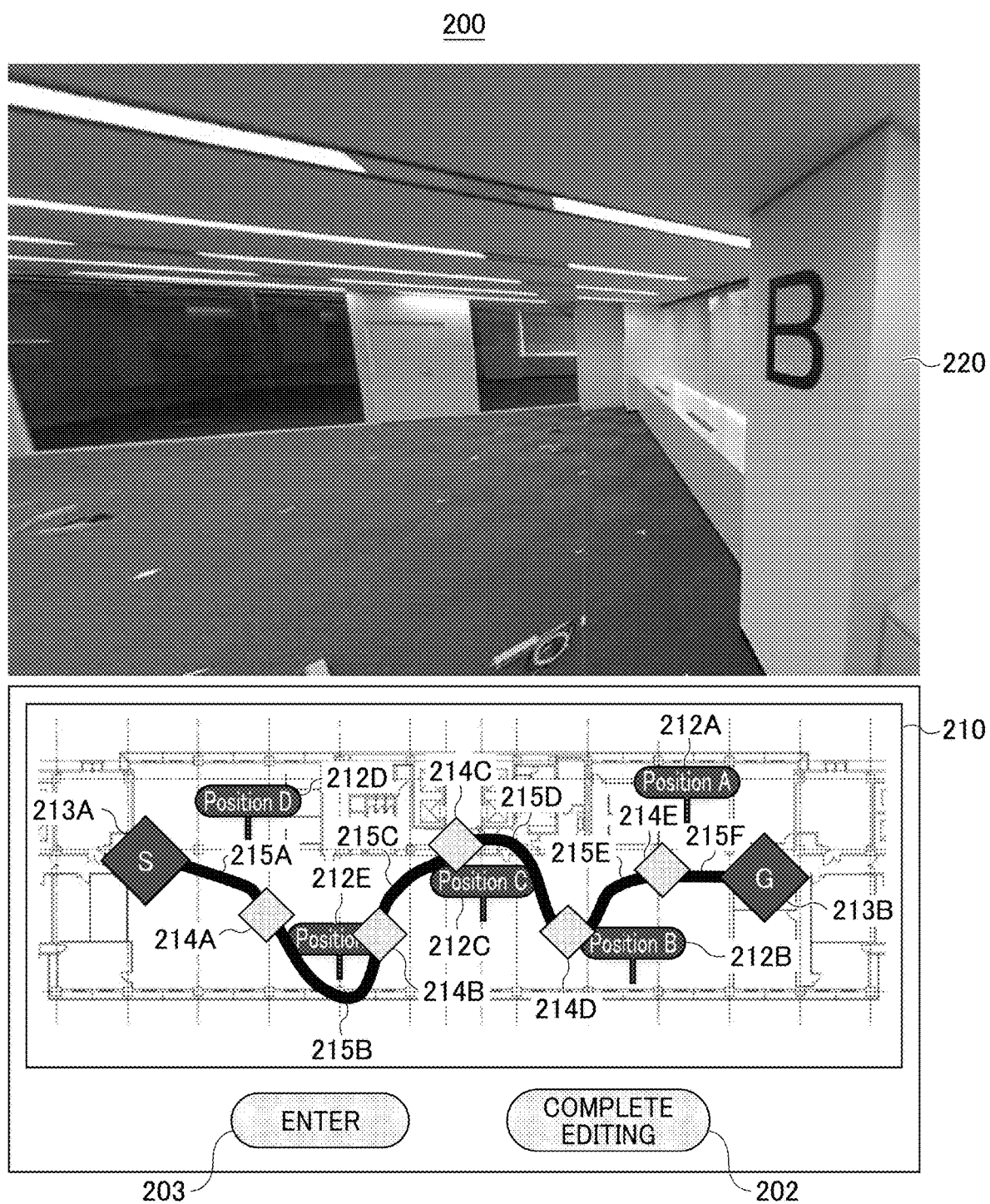
FIG. 22 is a diagram illustrating an example of the input/output screen before a second image capturing position is changed, according to the exemplary embodiment of the present disclosure.

FIG. 22 is a diagram illustrating an example of the input/output screen 200 before a second image capturing position is changed, according to the present embodiment.

FIG. 22 illustrates a state in which the display control unit 93 displays the input/output screen 200 on the display 906 in Step S22 of FIG. 17.

The input/output screen 200 is generated by the generation unit 54 of the server 50 in Step S20 of FIG. 17, displays the map 211, the plurality of fixed image capturing position images 212A to 212E positioned with respect to the map 211, and the tour image 250 illustrated in FIG. 21 in a superimposed manner, and displays a captured image 220, an edit completion button 202, and a confirmation button 203.

The image capturing start position image 213A and the image capturing end position image 213B included in the tour image 250 are positioned with respect to the map 211 as described with reference to FIG. 20.

As described with reference to FIG. 21, the positions of the still image capturing position images 214A to 214E included in the tour image 250 with respect to the image capturing start position image 213A and the image capturing end position image 213B are temporarily determined, but are not determined with respect to the map 211. The still image capturing position image 214 is an example of a second position image indicating a second capturing position that is not positioned with respect to the map 211, but temporarily positioned with respect to the first capturing position.

As described with reference to FIG. 21, the path images 215A to 215F included in the tour image 250 are also temporarily positioned with respect to the image capturing start position image 213A, the image capturing end position image 213B, and the still image capturing position images 214A to 214E, but are not positioned with respect to the map 211.

The captured image 220 is an image captured at one of the image capturing start position, the image capturing end position, and the still image capturing position.

In other words, when the user performs a designation operation of designating one of the image capturing start position image 213A, the image capturing end position image 213B, or one of the still image capturing position images 214A to 214E on the map 211 displayed on the input/output screen 200, the reception unit 92 receives the designation operation, and the display control unit 93 displays the captured image 220 captured at the image capturing position indicated by the designated position image on the input/output screen 200. In the description of the present embodiment, the captured image 220 illustrated in FIG. 22 is an image captured at an image capturing position indicated by the still image capturing position image 214B.

Figure 23:
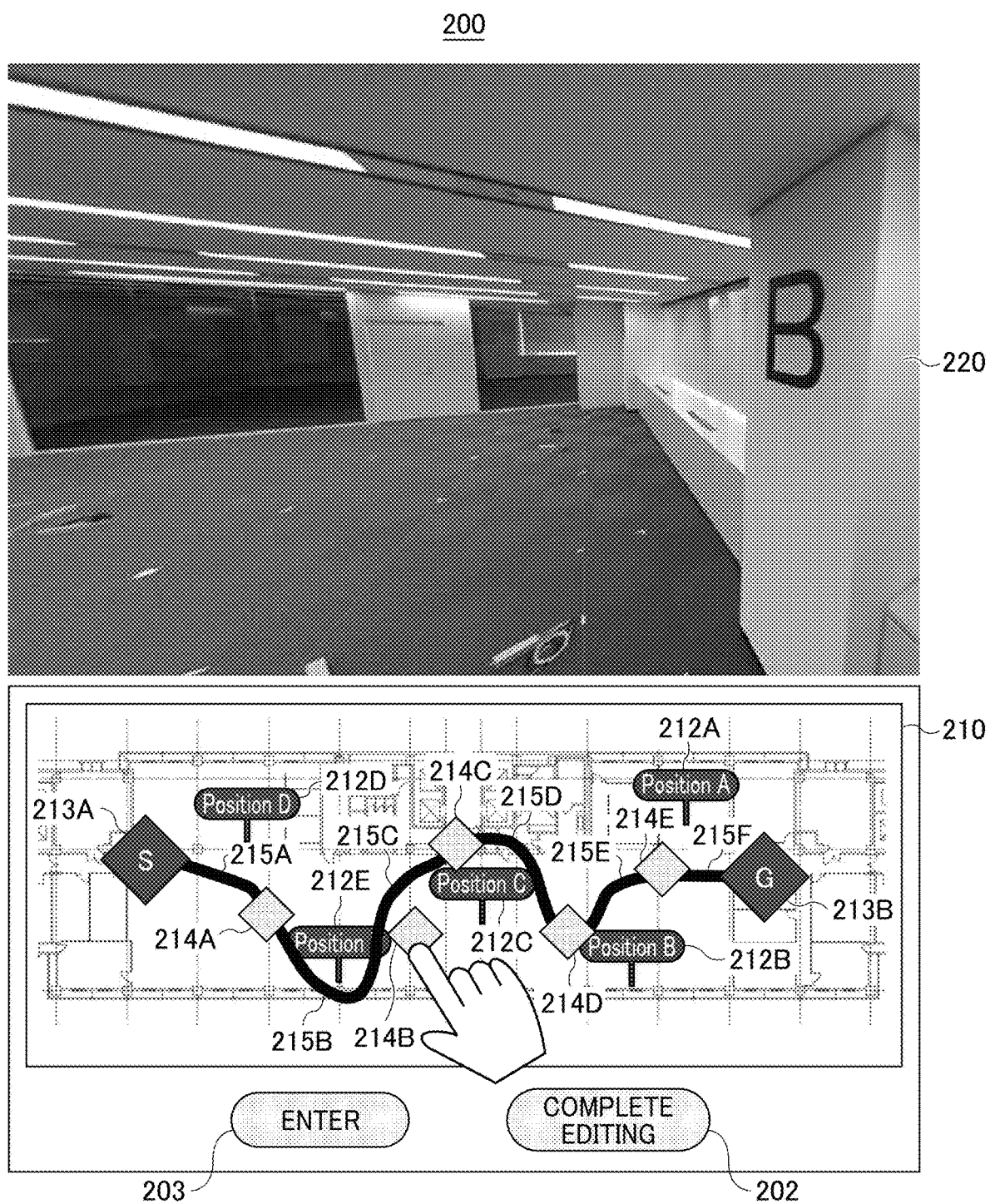
FIG. 23 is a diagram illustrating an example of the input/output screen after the second image capturing position is changed, according to the exemplary embodiment of the present disclosure.

FIG. 23 is a diagram illustrating an example of the input/output screen 200 after the second image capturing position is changed, according to the present embodiment.

FIG. 23 illustrates a state in which the position of the still image capturing position image 214B is changed from the state illustrated in FIG. 22.

When the user performs a position change operation that is an operation of changing the relative position of the still image capturing position image 214B with respect to the image capturing start position image 213A and the image capturing end position image 213B on the map 211 displayed on the input/output screen 200, the reception unit 92 receives the position change operation.

In this state, when the user operates the edit completion button 202, the reception unit 92 receives an instruction operation for positioning with respect to the map 211 a still image capturing position indicated by the still image capturing position image 214B whose the position has been changed.

In the description of the present embodiment, the edit completion button 202 may not be provided, and when the position change operation for the still image capturing position image 214B is completed, the editing may be automatically completed and the still image capturing position indicated by the still image capturing position image 214B may be positioned with respect to the map 211.

Further, in alternative to the edit completion button 202, an edit cancel button for canceling a series of editing operations may be provided, and when the user operates the edit cancel button, positioning of the still image capturing position indicated by the still image capturing position image 214B with respect to the map 211 may be canceled.

In this case, the still image capturing position image 214B may be returned to the position before the position change operation.

When the user operates the confirmation button 203, the reception unit 92 receives the operation, and as described in Step S23 of FIG. 17, the transmission/reception unit 91 transmits the still image capturing position after the position change to the server 50.

In the description of the present embodiment, the display control unit 93 may change and display line shapes formed by the path image 215B and the path image 215C so that the path image 215B and the path image 215C are connected to the still image capturing position image 214B in accordance with the position change of the still image capturing position image 214B.

When the user operates the confirmation button 203 to confirm the still image capturing position, the transmission/reception unit 91 may transmit the path indicated by the path image 215 whose the line shape is confirmed to the server 50.

Accordingly, as illustrated in FIG. 19, when the input/output screen 200 displays the fixed image capturing position image 212 related to a previous image capturing position, the path image 215 indicating the path related to the connection relationship between the image capturing start position, the image capturing end position, and the fixed image capturing position can also be displayed, and the user can confirm the path at the time of the previous image capturing.

Figure 24:
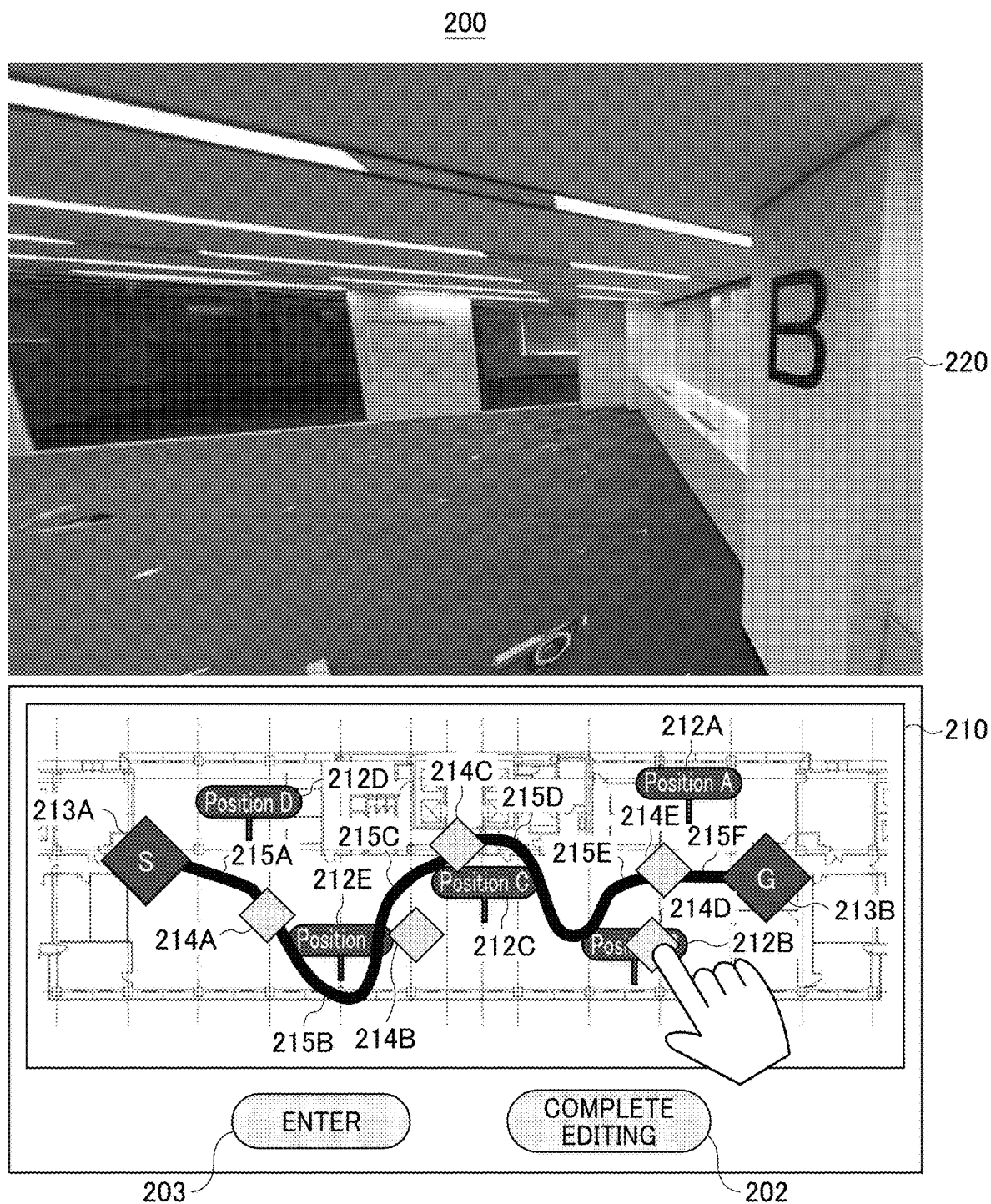
FIG. 24 is a diagram illustrating an example of the input/output screen for describing associating the second image capturing position and a fixed image capturing position according to the exemplary embodiment of the present disclosure.

FIG. 24 is a diagram illustrating an example of the input/output screen 200 for describing associating the second image capturing position and the fixed image capturing position according to the present embodiment.

FIG. 24 illustrates a state in which a position of the still image capturing position image 214D is changed from the state illustrated in FIG. 23.

When the user performs an operation for changing the relative position of the still image capturing position image 214D with respect to the image capturing start position image 213A and the image capturing end position image 213B and overlapping the still image capturing position image 214D on the fixed image capturing position image 212B on the map 211 displayed on the input/output screen 200, the reception unit 92 receives an operation of associating the still image capturing position image 214D with the fixed image capturing position image 212B.

In this state, when the user operates the edit completion button 202, the reception unit 92 receives an instruction operation for positioning with respect to the map 211 the still image capturing position indicated by the still image capturing position image 214D whose the position has been changed by associating with the same position as the fixed image capturing position indicated by the fixed image capturing position image 212B.

In the description of the present embodiment, when the user performs an operation for changing the relative position of the still image capturing position image 214D to be brought to be closer to the fixed image capturing position image 212B, the reception unit 92 may receive an operation of associating the still image capturing position image 214D with the fixed image capturing position image 212B.

The display control unit 93 may change the display form by changing the color of one or both of the still image capturing position image 214D and the fixed image capturing position image 212B or blinking one or both of the still image capturing position image 214D and the fixed image capturing position image 212B so that a matter that the still image capturing position image 214D and the fixed image capturing position image 212B are associated with each other is recognizable. For example, the still image capturing position image 214D can be displayed as a circle or a rhombus, and the fixed image capturing position image 212B can be displayed with a pin indicating a position.

Figure 25:
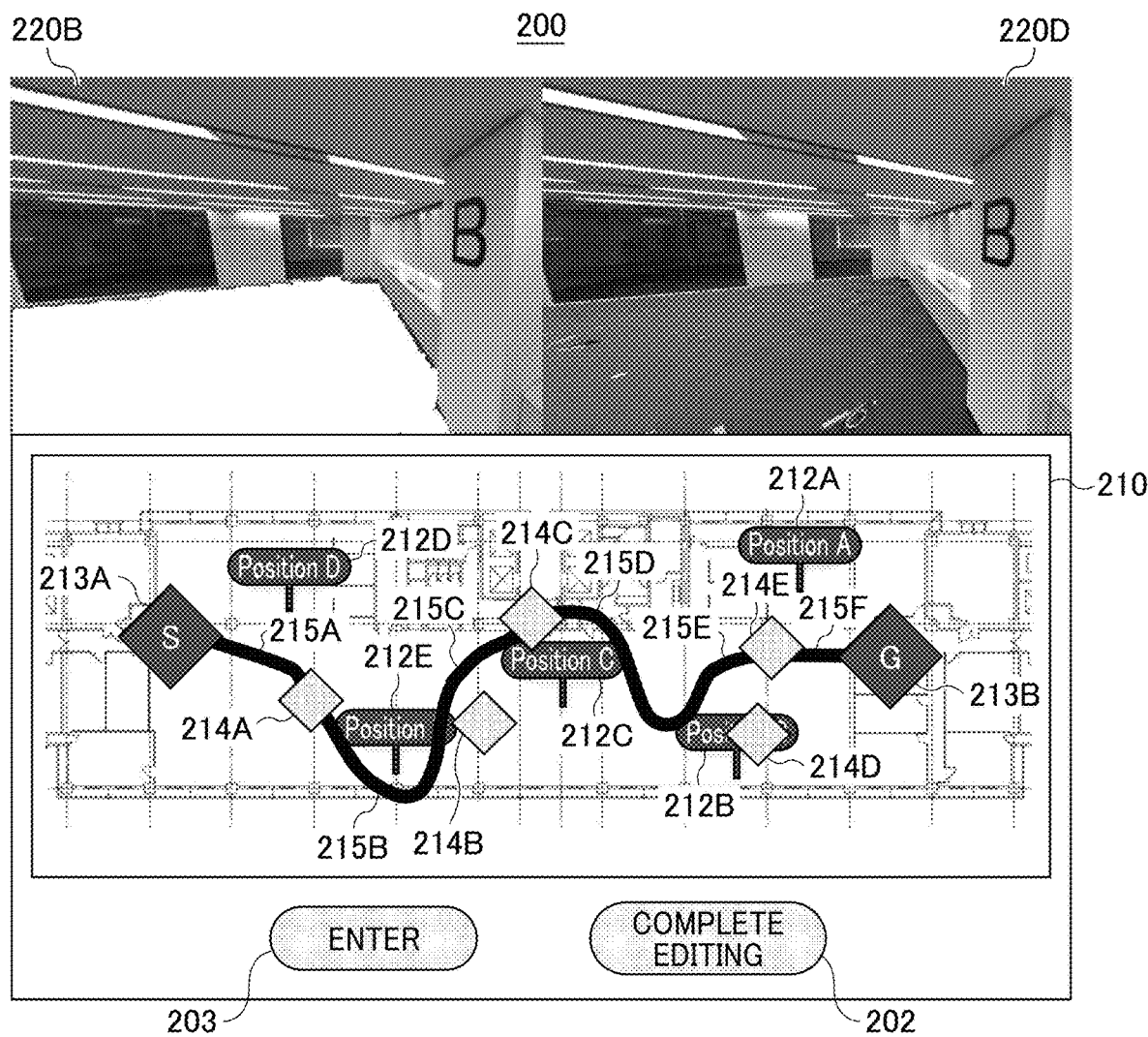
FIG. 25 is a diagram illustrating an example of the input/output screen after the second image capturing position and the fixed image capturing position are associated with each other according to the exemplary embodiment of the present disclosure.

FIG. 25 is a diagram illustrating an example of the input/output screen 200 after the second image capturing position and the fixed image capturing position are associated with each other according to the present embodiment, which is a state after FIG. 24.

The input/output screen 200 displays a captured image 220B captured at the fixed image capturing position image 212B and the captured image 220D captured at the still image capturing position image 214D.

In this state, when the user operates the confirmation button 203, the reception unit 92 receives the operation, and as described in Step S23 of FIG. 17, the transmission/reception unit 91 transmits the still image capturing position image 214D after the position change to the server 50.

Figure 26:
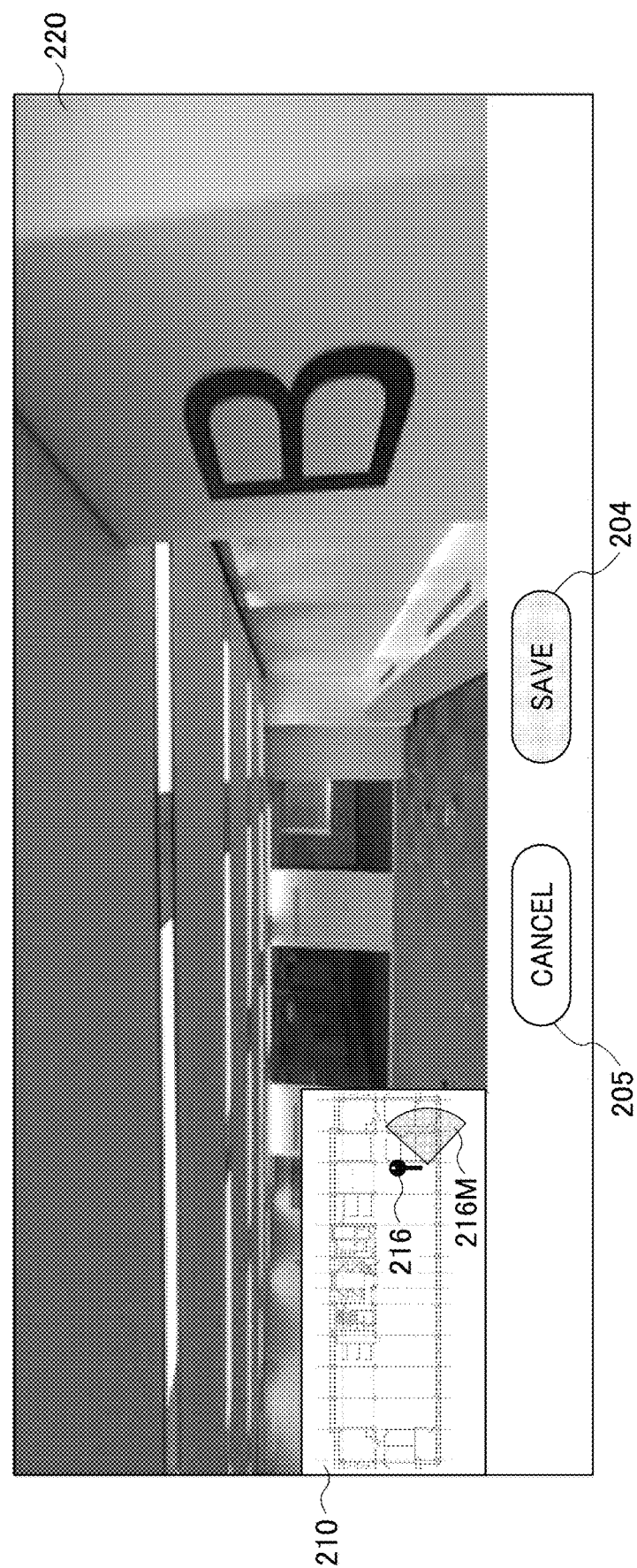
FIG. 26 is a diagram illustrating an example of the input/output screen including a mark indicating an image capturing direction/range according to the exemplary embodiment of the present disclosure.

FIG. 26 is a diagram illustrating an example of the input/output screen 200 including a mark indicating an image capturing direction/range according to the present embodiment.

When the user performs, for example, a long-press operation on one of the image capturing start position image 213A, the image capturing end position image 213B, or one of the still image capturing position images 214A to 214E in any one of the states illustrated in FIGS. 22 to 25, the reception unit 92 receives the operation, and the display control unit 93 displays the input/output screen 200 illustrated in FIG. 26.

The input/output screen 200 displays an image capturing position image 216 that is operated by long-pressed operation and a mark 216M superimposed on the map 211, and displays the captured image 220 captured at the image capturing position image 216, a save button 204, and a cancel button 205.

The mark 216M is displayed as a so-called a sector surrounded by two lines indicating the radius of a circle and an arc between the lines with the image capturing position image 216 as the center, the direction from the image capturing position image 216 toward the midpoint of the arc of the sector indicates an image capturing direction of the captured image 220, and the central angle of the sector indicates a display range in which the captured image 220 is displayed. For example, when a direction in which the shutter button of the special image capturing device illustrated in FIG. 10A is present is defined as rear and another direction on which the shutter button is not present is defined as front, a direction in the front in which the image capturing optical system captures an image is referred to as an image capturing direction.

The image capturing direction indicated by the mark 216M is specified by the orientation information calculated by the electronic compass 118 of the image capturing device 10 illustrated in FIG. 13 and the orientation information in the map 211, and the display range indicated by the mark 216M is specified by an angle of view at the time of image capturing.

The electronic compass 118 computes an orientation and a tilt (roll angle) of the image capturing device 10 based on the Earth's magnetism to output orientation/tilt information. The orientation/tilt information is attached to an image in accordance with a metadata format called Exif. The orientation/tilt information is used for image processing such as image correction performed on an image. The Exif includes a date and time at which an image is captured, a thumbnail of image data, and a data capacity of the image data. The orientation may be calculated in combination with the acceleration detected by the acceleration sensor in addition to using the electronic compass.

When a spherical image is displayed, the image capturing orientation and the display range indicated by the mark 216M are specified by the image capturing direction and the angle of view of the virtual camera IC illustrated in FIG. 5.

The image capturing direction of the virtual camera IC is initially set to, for example, the front direction of the image capturing device 10 at the time of image capturing, and the angle of view of the virtual camera IC is set to a predetermined initial value.

Although the display direction and the display range of the captured image 220 displayed on the input/output screen 200 are supposed to coincide with the image capturing orientation and the display range indicated by the mark 216M, deviation may occur due to one or more of various errors.

In this point of view, an object of the present embodiment is to reduce such deviation occurring between the display direction and the display range of the captured image 220 and the image capturing orientation and the display range indicated by the mark 216M.

When the user performs an operation to change the direction of the sector of the mark 216M on the map 211 displayed on the input/output screen 200, the reception unit 92 receives the direction change operation.

In other words, the reception unit 92 receives an operation of changing the image capturing direction indicated by the mark 216M without changing the display direction of the captured image 220.

In this state, when the user operates the save button 204, the reception unit 92 receives the operation as an instruction operation for saving the changed direction of the sector.

When the user performs an operation for changing the central angle of the sector representing the mark 216M on the map 211 displayed on the input/output screen 200, the reception unit 92 receives the range change operation.

In other words, the reception unit 92 receives an operation of changing the display range indicated by the marks 216M without changing the display range of the captured image 220.

In this state, when the user operates the save button 204, the reception unit 92 receives the operation as an instruction operation for saving the changed central angle of the sector.

On the other hand, when the user performs an operation for changing the display direction of the captured image 220 displayed on the input/output screen 200, the reception unit 92 receives the direction change operation.

In other words, the reception unit 92 receives an operation for changing the display direction of the captured image 220 without changing the image capturing direction indicated by the mark 216M.

In this state, when the user operates the save button 204, the reception unit 92 receives the operation as an instruction operation for saving the changed display direction of the captured image 220.

When the user performs an operation for changing the display range of the captured image 220 displayed on the input/output screen 200, the reception unit 92 receives the range change operation.

In other words, the reception unit 92 receives an operation for changing the display range of the captured image 220 without changing the display range indicated by the mark 216M.

In this state, when the user operates the save button 204, the reception unit 92 receives the operation as an instruction operation for saving the changed display range of the captured image 220.

When the user operates the cancel button 205, the reception unit 92 receives the operation, and the display control unit 93 displays the input/output screen 200 that is one of FIGS. 22 to 25.

Figure 27:
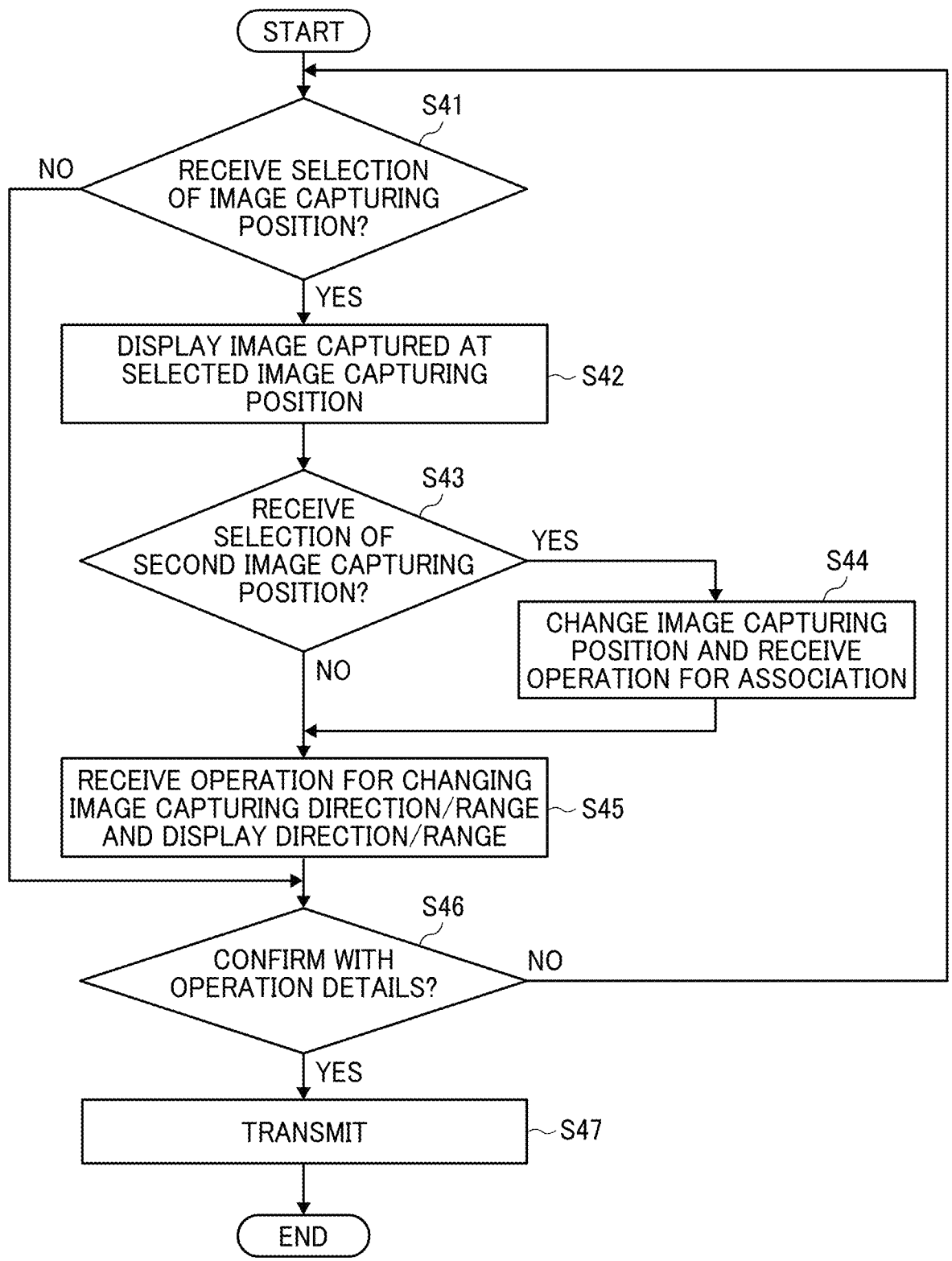
FIG. 27 is a flowchart illustrating an example of a process for changing an image capturing position according to the exemplary embodiment of the present disclosure.

FIG. 27 is a flowchart illustrating an example of a process for changing an image capturing position according to the present embodiment.

As illustrated in FIGS. 22 to 25, when the user performs a selection operation of selecting one of the image capturing start position image 213A, the image capturing end position image 213B, or one of the still image capturing position images 214A to 214E displayed on the input/output screen 200, the reception unit 92 receives the operation (Step S41), and the display control unit 93 displays the captured image 220 captured at the image capturing position indicated by the position image, on which the selection operation is performed, on the input/output screen 200 (Step S42). If the selection operation is not performed in Step S41, the process proceeds to Step S46, which is described later.

When the still image capturing position image 214 is selected (Step S43), as described with reference to FIG. 23, and when the user performs an operation for changing the relative position of the still image capturing position image 214 with respect to the image capturing start position image 213A and the image capturing end position image 213B on the map 211 displayed on the input/output screen 200, the reception unit 92 receives the operation.

In addition, as described with reference to FIG. 24, when the user performs an operation for changing the relative position of the still image capturing position image 214 with respect to the image capturing start position image 213A and the image capturing end position image 213B on the map 211 displayed on the input/output screen 200 and overlapping the still image capturing position image 214 on the fixed image capturing position image 212, the reception unit 92 receives an operation for associating the still image capturing position image with the fixed image capturing position image 212 (Step S44).

As described with reference to FIG. 26, when the user performs an operation for changing the direction of the sector representing the mark 216M on the map 211 displayed on the input/output screen 200, the reception unit 92 receives the operation.

When the user performs an operation for changing the central angle of the sector representing the mark 216M on the map 211 displayed on the input/output screen 200, the reception unit 92 receives the operation.

When the user performs an operation for changing the display direction of the captured image 220 displayed on the input/output screen 200, the reception unit 92 receives the operation.

When the user performs an operation for changing the display range of the captured image 220 displayed on the input/output screen 200, the reception unit 92 receives the operation (Step S45).

Then, as described with reference to FIGS. 23 and 25, when the user operates the confirmation button 203, the reception unit 92 receives the operation (Step S46), and as described with reference to Step S23 in FIG. 17, the transmission/reception unit 91 transmits the details related to the operation and the change performed in steps S44 and S45 to the server 50 (Step S47). When the confirmation button 203 is not operated in Step S46, the process returns to Step S41 to continue the process.

Figure 28A:
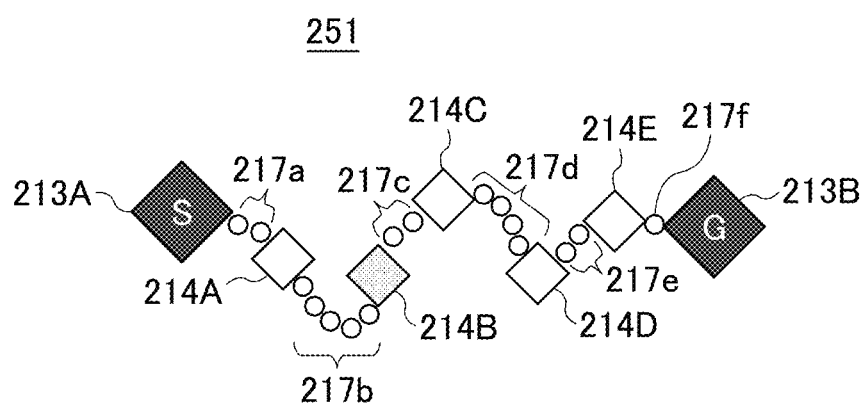
FIGS. 28A and 28B are diagrams each illustrating a tour image according to a first modification of the exemplary embodiment of the present disclosure.
Figure 28B:
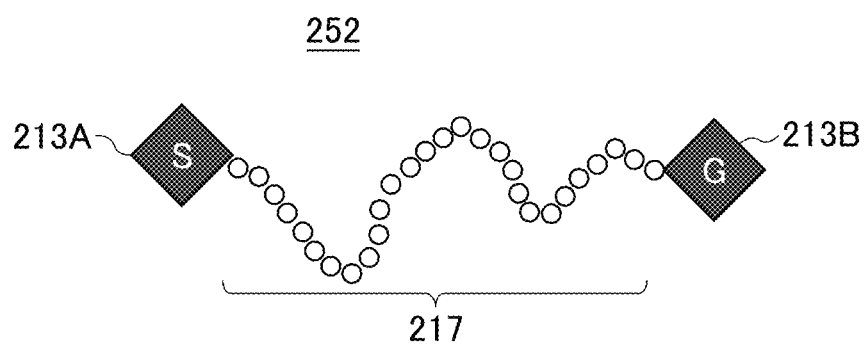

FIGS. 28A and 28B are diagrams each illustrating a tour image according to a first modification of the present embodiment.

A tour image 251 illustrated in FIG. 28A includes moving image capturing position images 217a to 217f in alternative to the path images 215A to 215F in the tour image 250 illustrated in FIG. 21.

The moving image capturing position images 217a to 217f indicate image capturing positions of still images obtained by capturing the moving image received in Step S18, and are examples of the second position image.

The position estimation unit 56 of the server 50 estimates a relative position of a still image capturing position at which a still image is captured from the moving image with respect to the image capturing start position and the image capturing end position based on the still images/moving images, the image capturing start position, and the image capturing end position received in Step S18 of FIG. 17.

The image processing unit 60 generates the tour image 251 including the image capturing start position image 213A, the image capturing end position image 213B, the still image capturing position images 214A to 214E, and the moving image capturing position images 217a to 217f.

In other words, the image processing unit 60 generates the still image capturing position images 214A to 214E and the moving image capturing position images 217a to 217f in a manner that each position of the still image capturing position images 214A to 214E with respect to the image capturing start position image 213A and the image capturing end position image 213B and each position of the moving image capturing position images 217a to 217f with respect to the image capturing start position image 213A and the image capturing end position image 213B are temporarily determined.

By appropriately setting the image capturing interval of the moving image, the moving image capturing position images 217a to 217f indicate the connection relationship between the image capturing start position image 213A, the image capturing end position image 213B, and the still image capturing position images 214A to 214E, in substantially the same manner as the case of the path images 215A to 215F.

A tour image 252 illustrated in FIG. 28B includes the image capturing start position image 213A, the image capturing end position image 213B, and the plurality of moving image capturing position images 217 in substantially the same manner as the tour image 251 illustrated in FIG. 28A, but does not include the still image capturing position images 214A to 214E.

In the first modification illustrated in FIGS. 28A and 28B, in the flowchart illustrated in FIG. 27, the processing for the moving image capturing position image 217 that is an example of the second position image is performed in substantially the same manner as the processing for the still image capturing position image 214.

Figure 29:
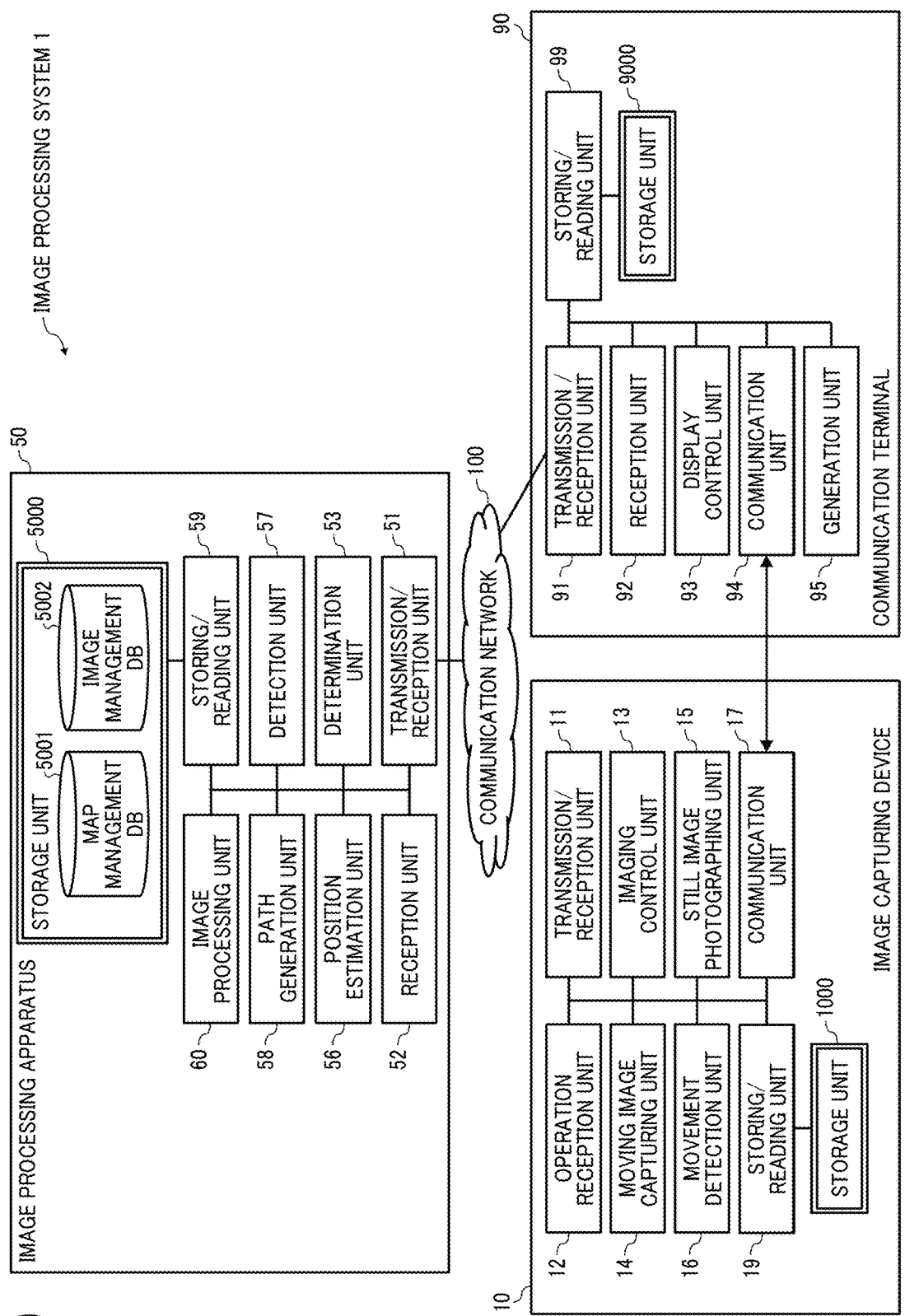
FIG. 29 is a diagram illustrating an example of a functional configuration of an image processing system according to a second modification of the exemplary embodiment of the exemplary embodiment of the present disclosure.

FIG. 29 is a diagram illustrating an example of a functional configuration of an image processing system according to a second modification of the present embodiment.

In the functional configuration of the second modification illustrated in FIG. 29, the communication terminal 90 includes a generation unit 95 in alternative to the generation unit 54 included in the server 50 in the functional configuration illustrated in FIG. 15.

The generation unit 95 generates an input/output screen based on various types of information read by the storing/reading unit 59 of the server 50 and received by the transmission/reception unit 91 of the communication terminal 90 from the server 50 in substantially the same manner as Step S3 in FIG. 17.

The display control unit 93 displays the input/output screen generated by the generation unit 95 on the display 906 in substantially the same manner as Step S5 of FIG. 17.

The transmission/reception unit 91 of the communication terminal 90 receives the tour image generated in Step S11 of FIG. 17 and various kinds of information read by the storing/reading unit 59 of the server 50 from the server 50, and the generation unit 95 generates an input/output screen based on the tour image and the various types of information received by the transmission/reception unit 91, in substantially the same manner as Step S20 of FIG. 17.

The display control unit 93 displays the input/output screen generated by the generation unit 95 on the display 906 in substantially the same manner as Step S22 of FIG. 17.

Figure 30:
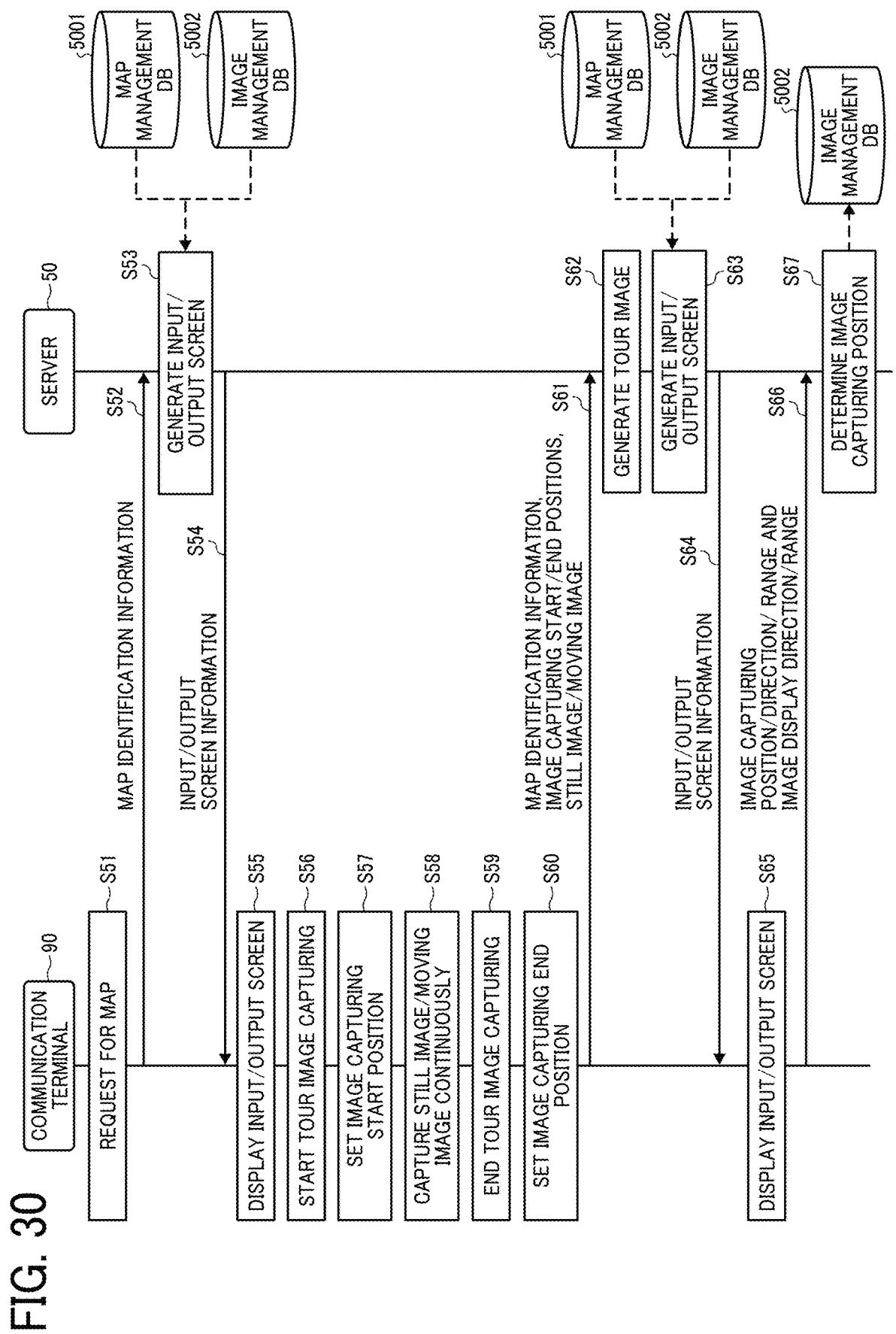
FIG. 30 is a sequence diagram illustrating an example of a process according to a third modification of the exemplary embodiment of the present disclosure.

FIG. 30 is a sequence diagram illustrating an example of a process according to a third modification of the present embodiment.

In the sequence diagram according to the third modification of FIG. 30, the image capturing device 10 and the communication terminal 90 in the sequence diagram of FIG. 17 are integrated with each other.

Steps S51 to S55 and S60 to S67 illustrated in FIG. 30 are substantially the same as Steps S1 to S5 and S17 to S24 illustrated in FIG. 17, respectively.

In Step S56, when the user performs an operation for instructing start of the tour image capturing, the reception unit 92 receives the start request of the tour image capturing, and an image capturing control unit integrated with the communication terminal 90 starts the tour image capturing based on the tour image capturing start request.

In Step S57, the reception unit 92 of the communication terminal 90 receives the setting of the image capturing start position when the user performs an operation for setting the image capturing start position on the input/output screen.

In Step S58, an operation reception unit integrated with the communication terminal 90 receives the setting of the image capturing start position and then receives an image capturing instruction when the user performs an operation for instructing for image capturing. An image capturing control unit integrated with the communication terminal 90 continuously captures still images/moving images by a still image capturing unit and a moving image capturing unit integrated with the communication terminal 90 based on the image capturing instruction.

In Step S59, when the user performs an operation for instructing ending the tour image capturing, the reception unit 92 receives the end request for the tour image capturing. The image capturing control unit ends the tour image capturing based on the end request for the tour image capturing.

Aspect 1

As described above, the server 50, which is an example of an information processing apparatus according to an embodiment of the present disclosure, includes the generation unit 54 that generates the input/output screen 200 that displays the map 211, the first position image 213 indicating a first image capturing position positioned with respect to the map 211, and the still image capturing position image 214 indicating a still image capturing position that is not positioned with respect to the map 211 but temporarily positioned with respect to the first image capturing position, in a superimposed manner, and receives a position change operation that is an operation of changing a relative position of the still image capturing position image 214 with respect to the first position image 213.

The still image capturing position and the still image capturing position image 214 are examples of a second capturing position and a second position image, and the generation unit 54 is an example of an input/output screen generation unit.

Accordingly, a position of the still image capturing position image 214 with respect to the map 211 can be changed to a position desired by a user.

Specifically, even when the position of the still image capturing position image 214 with respect to the map 211 is shifted due to a shift in the relative position of the still image capturing position with respect to the first image capturing position, the position of the still image capturing position image 214 with respect to the map 211 can be accurately aligned by changing the relative position with respect to the first position image 213.

In addition, since the still image capturing position image 214 is displayed in a state of being aligned to the map 211 to some extent via the first image capturing position, alignment with respect to the map 211 can be easily performed compared to a case where alignment is performed from zero with respect to the map 211.

Further, a service can be provided regardless of a level of skill of the user. A user with a low level of skill can perform image management using the estimated and automatically arranged still image capturing position image 214, and a user with a high level of skill can perform image management after performing positioning of the still image capturing position image 214. In this way, an optimum service can be provided regardless of the level of skill.

In addition, for example, in a case of use at a construction site, it is assumed that the site is not always bright, and places in an interior space of a building where electricity is not available have site conditions of being dim. Since the image capturing position is estimated by calculating a position of a feature point on an image from a plurality of images obtained by capturing a moving image, if the image is dark, the position of the feature point is failed to be correctly calculated, and as a result, the estimated image capturing position may be erroneously output. At this time, Aspect 1 in which the still image capturing position image 214 can be aligned with the map 211 is useful.

Aspect 2

Instruction Operation

In Aspect 1, the input/output screen 200 displays the edit completion button 202 that receives an instruction operation for positioning with respect to the map 211 the second image capturing position indicated by the second position image with the relative position having been changed according to the position change operation.

Accordingly, positioning of the second image capturing position with respect to the map 211 can be easily performed.

Aspect 3

Start Image Capturing/End Image Capturing

In Aspect 1 or Aspect 2, the first image capturing position includes at least one of an image capturing start position and an image capturing end position, and the first position image 213 includes at least one of an image capturing start position image 213A indicating the image capturing start position and an image capturing end position image 213B indicating the image capturing end position.

Accordingly, since the second position image is displayed in a state of being aligned to the map 211 to some extent via at least one of the image capturing start position and the image capturing end position, alignment with respect to the map 211 can be easily performed compared to a case where alignment is performed from zero with respect to the map 211.

Aspect 4
Plurality of Second Image Capturing Positions

In any one of Aspect 1 to Aspect 3, the second image capturing position includes a plurality of second image capturing positions, and the second position image includes a plurality of second position images.

In this case, alignment of the plurality of second position images with respect to the map 211 can be easily performed.

Aspect 5
Path

In Aspect 4, the input/output screen 200 displays the path image 215 indicating a path between two image capturing positions included in the plurality of second image capturing positions.

Accordingly, the alignment of the second position image can be easily performed while referring to the path image 215.

Aspect 6
Path

In any one of Aspect 1 to Aspect 5, the input/output screen 200 displays the path image 215 indicating the path between the first image capturing position and the second image capturing position.

Accordingly, the alignment of the second position image can be easily performed while referring to the path image 215.

Aspect 7
Still Image/Moving Image

In Aspect 5 or Aspect 6, each of the first image capturing position and the second image capturing position indicates an image capturing position for a still image, and the path indicates an image capturing position for a moving image.

Aspect 8

In any one of Aspect 1 to Aspect 7, the second image capturing position includes an image capturing position for a moving image, and the second position image includes the moving image capturing position image 217 indicating the image capturing position for the moving image.

Aspect 9
Display Captured Image

In any one of Aspect 1 to Aspect 8, the input/output screen 200 displays along with the map 211 the captured image 220 captured at the first image capturing position or the second image capturing position.

Accordingly, the alignment of the second position image can be easily performed while the displayed captured image 220 is being referred.

Aspect 10
Display Mark

In Aspect 9, the input/output screen 200 displays the mark 216M indicating at least one of a capturing direction and a display range of the captured image 220 on the map 211.

Accordingly, at least one of an image capturing direction and a display range indicated by the mark 216M and at least one of the display direction and the display range of the captured image 220 can be associated with each other to be checked.

Aspect 11
Change Mark

In Aspect 10, the input/output screen 200 receives an operation for changing at least one of the image capturing direction and the display range indicated by the mark 216M without changing the display direction and the display range of the captured image 220.

Accordingly, when at least one of the image capturing direction and the display range indicated by the mark 216M is shifted from at least one of the display direction and the display range of the captured image 220, at least one of the image capturing direction and the display range indicated by the mark 216M can be operated to be matched at least one of the display direction and the display range of the captured image 220.

Aspect 12
Change Captured Image

In Aspect 10 or Aspect 11, the input/output screen 200 receives an operation of changing at least one of the display direction and the display range of the captured image 220 without changing the image capturing direction and the display range indicated by the mark 216M.

Accordingly, when at least one of the display direction and the display range of the captured image 220 is shifted from at least one of the image capturing direction and the display range indicated by the mark 216M, at least one of the display direction and the display range of the captured image 220 can be operated to match at least one of the image capturing direction and the display range indicated by the mark 216M.

As an aspect different from Aspect 11 and Aspect 12, in Aspect 10, the input/output screen 200 may receive an operation of changing at least one of the image capturing direction and the display range indicated by the mark 216M, and may receive an operation of changing at least one of the display direction and the display range of the captured image 220.

Aspect 13
Fixed Image Capturing Position

In any one of Aspect 1 to Aspect 12, the input/output screen 200 displays the fixed image capturing position image 212 indicating a fixed image capturing position which is positioned with respect to the map 211 and is not positioned with respect to the first image capturing position and the second image capturing position so as to be superimposed on the first position image 213 and the second position image.

Accordingly, positioning of the second position image (still image capturing position image 214) can be easily performed while the fixed image capturing position image 212 is being referred.

Aspect 14
Association

In Aspect 13, the input/output screen 200 receives an operation of associating the second image capturing position with the fixed image capturing position by superimposing the second position image on or bringing the second position image close to, or in an adjacent area of, the fixed image capturing position image 212 as the position change operation.

Accordingly, since the fixed image capturing position and the second image capturing position can be associated with each other as the same position or proximate positions, the captured image previously captured at the fixed image capturing position with the captured image currently captured at the second image capturing position can be easily compared.

Aspect 15

Estimate Position

In any one of Aspect 1 to Aspect 14, a position estimation unit 56 that estimates a relative position of the second image capturing position with respect to the first image capturing position based on the first captured image captured at the first image capturing position and the second captured image captured at the second image capturing position is further included, and the input/output screen 200 displays the second position image at a temporarily determined position with respect to the first position image 213 based on the relative position estimated by the position estimation unit 56.

As a result, the second position image can be displayed at the temporarily determined position with respect to the first position image 213.

Aspect 16

A communication terminal 90, which is an example of an input/output apparatus according to an embodiment of the disclosure includes the display control unit 93 that displays a map 211, the first position image 213 indicating a first image capturing position positioned with respect to the map 211, and a second position image indicating a second image capturing position that is not positioned with respect to the map 211 but temporarily positioned with respect to the first image capturing position on the display 906, which is an example of a display unit, in a superimposed manner, and a reception unit 92 that receives a position change operation that is an operation of changing a relative position of the second position image with respect to the first position image 213.

Accordingly, the position of the second position image with respect to the map 211 can be changed to a position desired by a user by using the communication terminal 90.

Aspect 17

An image processing system, which is an example of an information processing system, according to an embodiment of the present disclosure includes the server 50 and the communication terminal 90. The server 50 and the communication terminal 90 are connected to each other so that can communicate with each other. The server 50 includes the generation unit 54 that generates the input/output screen 200 that displays the map 211, the first position image 213 indicating a first image capturing position positioned with respect to the map 211, and a second position image indicating a second image capturing position not positioned with respect to the map 211 but temporarily positioned with respect to the first photographing position, in a superimposed manner, and the transmission/reception unit 51 that transmits information on the input/output screen 200 indicating the input/output screen 200 to the communication terminal 90. The communication terminal 90 includes the transmission/reception unit 91 that receives the information on the input/output screen 200, the display control unit 93 that displays the input/output screen 200 on the display 906 based on the information on the input/output screen 200, and the reception unit 92 that receives a position change operation that is an operation of changing a relative position of the second position image with respect to the first position image 213.

Aspect 18

An information processing method according to an embodiment of the present disclosure includes an input/output screen generation step of generating the input/output screen 200 for displaying the map 211, the first position image 213 indicating a first image capturing position positioned with respect to the map 211, and a second position image indicating a second image capturing position that is not positioned with respect to the map 211 but temporarily positioned with respect to the first image capturing position, in a superimposed manner, and receiving a position change operation that is an operation of changing a relative position of the second position image with respect to the first position image 213.

Aspect 19

An input/output method according to an embodiment of the present disclosure includes a display step of displaying the map 211, the first position image 213 indicating a first image capturing position positioned with respect to the map 211, and a second position image indicating a second image capturing position that is not positioned with respect to the map 211 but temporarily positioned with respect to the first image capturing position, in a superimposed manner, and a reception step of receiving a position change operation that is an operation of changing a relative position of the second position image with respect to the first position image 213.

Aspect 20

A program according to an embodiment of the present disclosure includes program codes which, when executed by one or more processors, causes the processors to execute one of the information processing method according to Aspect 18 and the input/output method according to Aspect 19.

According to an embodiment of the present disclosure, a position of an image capturing position with respect to a map can be changed to a position desired by a user.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Although the image processing method, the program, the server, and the image processing system according to embodiments of the present disclosure have been described above, the above-described embodiments are illustrative and do not limit the present disclosure. The above-described embodiments of the present disclosure may be modified within a range that can be conceived by those skilled in the art. The modification includes additions of other embodiments, modifications, and deletions. The modifications are included in the scope of the present disclosure as long as the actions and effects of the present disclosure are provided.

For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing apparatus comprising circuitry configured to:
generate an input-and-output screen that displays, in a superimposed manner, a map, a first position image indicating a first image capturing position positioned with respect to the map, and a second position image indicating a second image capturing position temporarily positioned with respect to the first image capturing position, and
receive a position change operation being an operation of changing a relative position of the second position image with respect to the first position image,
wherein the input-and-output screen displays, in a superimposed manner, a fixed position image, the first position image, and the second position image, the fixed position image indicating a fixed image capturing position that is positioned with respect to the map.

2. The information processing apparatus of claim 1, wherein the input-and-output screen further receives an instruction operation for positioning the second image capturing position with respect to the map, the second image capturing position being indicated by the second position image with the relative position having been changed according to the position change operation.

3. The information processing apparatus of claim 1, wherein the first image capturing position includes at least one of an image capturing start position indicating a position where image capturing starts or an image capturing end position indicating a position where image capturing ends.

4. The information processing apparatus of claim 1, wherein the second image capturing position includes a plurality of second image capturing positions.

5. The information processing apparatus of claim 4, wherein the input-and-output screen displays a path image indicating a path between two of the plurality of second image capturing positions.

6. The information processing apparatus of claim 5, wherein each of the first image capturing position and the second image capturing position indicates an image capturing position for a still image, and the path indicates an additional image capturing position for a moving image.

7. The information processing apparatus of claim 1, wherein the input-and-output screen displays a path image indicating a path between the first image capturing position and the second image capturing position.

8. The information processing apparatus of claim 1, wherein the second image capturing position includes an image capturing position for a moving image.

9. The information processing apparatus of claim 1, wherein the input-and-output screen displays, along with the map, a captured image captured at one of the first image capturing position and the second image capturing position.

10. The information processing apparatus of claim 9, wherein the input-and-output screen displays, on the map, a mark indicating at least one of an image capturing direction of the captured image or a display range of the captured image.

11. The information processing apparatus of claim 10, wherein the input-and-output screen receives an operation for changing the at least one of the image capturing direction indicated by the mark or the display range indicated by the mark.

12. The information processing apparatus of claim 10, wherein the input-and-output screen receives an operation for changing at least one of a display direction of the captured image or a display range of the captured image.

13. The information processing apparatus of claim 1, wherein
the input-and-output screen receives, as the position change operation, an operation for associating the second image capturing position with the fixed image capturing position, the operation being one of overlapping the second position image with the fixed position image and bringing the second position image in an adjacent area of the fixed position image.

14. The information processing apparatus of claim 1, wherein
the circuitry is further configured to estimate the relative position of the second image capturing position with respect to the first image capturing position based on a first captured image captured at the first image capturing position and a second captured image captured at the second image capturing position, and
the input-and-output screen displays the second position image with respect to the first position image based on the estimated relative position.

15. A system comprising:
the information processing apparatus of claim 1; and
a communication terminal comprising terminal circuitry configured to communicated with the information processing apparatus and to display, on a display, the input-and-output screen based on the input-and-output screen information.

16. The information processing apparatus of claim 1, wherein the second image capturing position is different from the first image capturing position.

17. An information processing method, comprising:
generating an input-and-output screen that displays, in a superimposed manner, a map, a first position image indicating a first image capturing position positioned with respect to the map, and a second position image indicating a second image capturing position temporarily positioned with respect to the first image capturing position, and
receiving a position change operation being an operation of changing a relative position of the second position image with respect to the first position image,
wherein the input-and-output screen displays, in a superimposed manner, a fixed position image, the first position image, and the second position image, the fixed position image indicating a fixed image capturing position that is positioned with respect to the map.

18. A non-transitory recording medium storing a plurality of instructions which, when executed by one or more processors, causes the processors to perform a method, the method comprising:
generating an input-and-output screen that displays, in a superimposed manner, a map, a first position image indicating a first image capturing position positioned with respect to the map, and a second position image indicating a second image capturing position temporarily positioned with respect to the first image capturing position, and
receiving a position change operation being an operation of changing a relative position of the second position image with respect to the first position image,
wherein the input-and-output screen displays, in a superimposed manner, a fixed position image, the first position image, and the second position image, the fixed position image indicating a fixed image capturing position that is positioned with respect to the map.

* * * * *